United States Patent
Le Chevalier

(10) Patent No.: US 12,210,670 B2
(45) Date of Patent: Jan. 28, 2025

(54) SYSTEMS AND METHODS FOR CLONED AVATAR MANAGEMENT IN A PERSISTENT VIRTUAL-REALITY ENVIRONMENT

(71) Applicant: Chegg, Inc., Santa Clara, CA (US)

(72) Inventor: Vincent Le Chevalier, Waikoloa, HI (US)

(73) Assignee: Chegg, Inc., Santa Clara, CA (US)

( * ) Notice: Subject to any disclaimer, the term of this patent is extended or adjusted under 35 U.S.C. 154(b) by 172 days.

(21) Appl. No.: 18/172,252

(22) Filed: Feb. 21, 2023

(65) Prior Publication Data

US 2024/0281052 A1  Aug. 22, 2024

(51) Int. Cl.
  *G06F 3/01*   (2006.01)
  *A63F 13/30*  (2014.01)
  *G06T 19/00*  (2011.01)

(52) U.S. Cl.
  CPC .............. *G06F 3/011* (2013.01); *A63F 13/30* (2014.09); *G06T 19/006* (2013.01); *A63F 2300/5553* (2013.01)

(58) Field of Classification Search
  CPC .. G06F 3/011; A63F 13/30; A63F 2300/5553; A63F 13/67; G06T 19/006
  See application file for complete search history.

(56) References Cited

U.S. PATENT DOCUMENTS

| | | | | |
|---|---|---|---|---|
| 2009/0199095 A1* | 8/2009 | Nicol, II | ............... | G06F 3/0484 715/767 |
| 2021/0339146 A1* | 11/2021 | Rico | ..................... | G06F 18/214 |
| 2023/0133049 A1* | 5/2023 | Cappello | .............. | G06V 10/764 345/419 |

* cited by examiner

*Primary Examiner* — Said Broome
*Assistant Examiner* — Andrew Shin
(74) *Attorney, Agent, or Firm* — Morgan, Lewis & Bockius LLP; Manita Rawat

(57) ABSTRACT

A method can include receiving data associated with a surrounding of a first online avatar of a user in a virtual reality application. A plurality of objects in the surrounding can be detected, characteristics of each object from the plurality of objects can be determined, and at least one movement parameter of each object can be predicted. Using a second machine learning model, an action to be executed by the first online avatar within the virtual reality application can be determined. The action can be converted to a user command based on a controller type of a controller that the user uses to control a second online avatar of the user in the virtual reality application. An instruction can be sent to effectuate, in the virtual reality application and based on the user command, the action to the first online avatar of the user without an input from the user.

21 Claims, 11 Drawing Sheets

500

502 — Receiving data associated with a surrounding of a first online avatar of a user in a virtual reality application, the first online avatar of the user being an alternative online avatar configured to perform a first plurality of actions based on a plurality of pre-determined rules, the alternative online avatar being different from a primary online avatar of the user configured to perform a second plurality of actions in the virtual reality application based on user's input

504 — Detecting, based on the data, an activity associated with a virtual person or a virtual place in the surrounding

506 — Determining, using a machine learning model, an action from the first plurality of actions based on the plurality of pre-determine rules to be applied to the first online avatar of the user to respond to the activity

508 — Sending an instruction to effectuate, in the virtual reality application, the action to the first online avatar of the user without an input from the user

FIG. 5

SYSTEMS AND METHODS FOR CLONED AVATAR MANAGEMENT IN A PERSISTENT VIRTUAL-REALITY ENVIRONMENT

TECHNICAL FIELD

Some embodiments described herein relate to virtual representation in persistent virtual environments. In particular, but not by way of limitation, some embodiments described herein relate to the creation and/or control of activities of avatars in virtual environments such as on or more virtual environments (e.g., worlds) of a network of virtual environments (e.g., a metaverse).

BACKGROUND

As is true of the real, physical world, virtual environments (e.g., a world of a metaverse) can be constructed to operate (i.e., run), persist, and be accessible to users continuously (e.g., twenty-four hours a day, seven days a week), regardless of a participation status of an individual user relative to the virtual environment(s) (e.g., regardless of whether the user is "present" in the virtual environment or not). Additionally, virtual environments (e.g., distinct worlds of a metaverse) may be simultaneously-operating. Because, like in the real, physical world, a user cannot actively participate in a virtual environment during all hours of operation (e.g., at least due to needing to sleep) and a user cannot simultaneously and actively be present in multiple virtual places, a need exists for an avatar management system for providing personalized avatar applications to users of virtual environments (e.g., virtual reality applications), such as those connected within a metaverse network.

SUMMARY

In some embodiments, a method includes receiving, at a processor, data associated with a surrounding of a first online avatar of a user in a virtual reality application. The method further includes detecting, at the processor based on the data and using a first machine learning model, a plurality of objects in the surrounding. The method further includes determining, at the processor and based on object types of the plurality of objects, a plurality of characteristics of each object from the plurality of objects. The method further includes predicting, at the processor, at least one movement parameter of each object, based on the data and the plurality of characteristics of that object. The method further includes determining, at the processor and using a second machine learning model, an action from a plurality of actions to be executed by the first online avatar within the virtual reality application, based on the at least one movement parameter of the object from the plurality of objects. The method further includes converting the action to a user command based on a controller type of a controller that the user uses to control a second online avatar of the user in the virtual reality application, and sending an instruction to effectuate, in the virtual reality application and based on the user command, the action to the first online avatar of the user without an input from the user.

BRIEF DESCRIPTION OF THE DRAWINGS

FIG. 5 illustrates a flow chart of an example cloned avatar management process, according to some embodiments.

DETAILED DESCRIPTION

Figure 1:
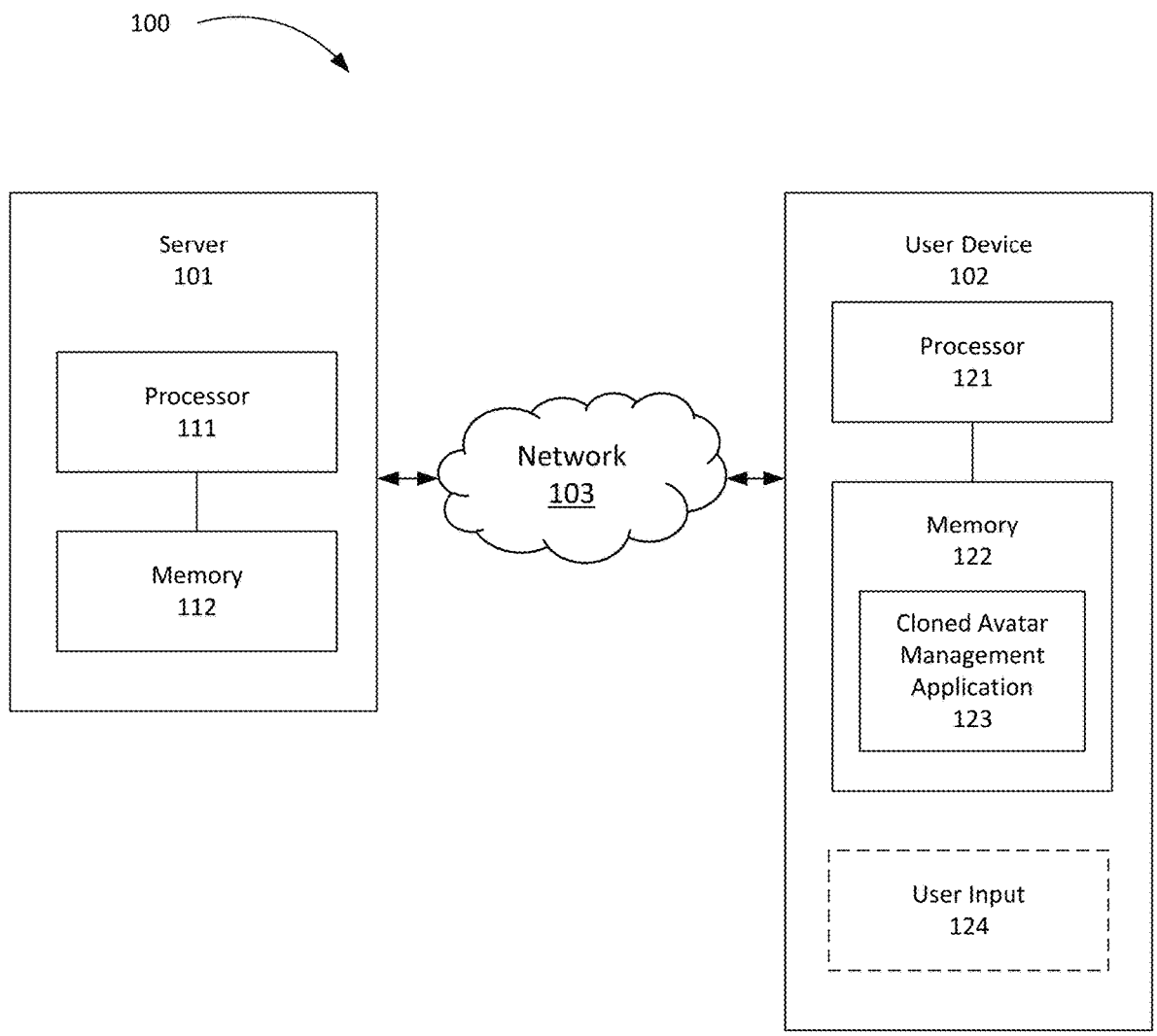
FIG. 1 is an example schematic diagram illustrating a cloned avatar management system, according to some embodiments.

In some embodiments, a metaverse includes integrated virtual platforms. In some implementations, the integrated virtual platforms can include immersive simulations, environments, and/or worlds in which users (e.g., individuals and/or businesses) can explore, create, socialize, participate in a variety of experiences (e.g., car racing, painting, attending a class, listening to a concert), and/or engage in economic activity. The integrated virtual platforms can be rendered, experienced, and traveled through in two dimensions or three dimensions. In some implementations, one or more of the virtual platforms can include augmented reality experiences. One or more of the virtual platforms, and thus the metaverse including the virtual platforms, can be persistent such that the virtual platform(s) continue indefinitely without resets, pauses, or ends. Additionally, one or more of the virtual platforms, and thus the metaverse including the virtual platforms, can be synchronous and live such the virtual platform(s) are available for all users to use continuously and in real-time. In some implementations, the metaverse can include a fully-functioning economy inclusive of production and consumption of goods and services occurring in or associated with one or more virtual platforms of the metaverse. Within the metaverse economy, individuals and businesses can create, own, invest, sell, and/or be rewarded for a wide range of work that produces value recognized by others. The metaverse can be populated by content and experiences created and operated by a wide range of contributors, such as independent individuals, informally-organized groups, and/or commercially-focused enterprises. Furthermore, pre-scheduled and/or self-contained events may occur in the metaverse, and users of the metaverse can participate in such events.

Users can participate in the metaverse through avatars having a presence in the metaverse. In some embodiments, an avatar (also referred to as an "online avatar") can be controlled by an intelligent software agent deployable within a virtual platform (also referred to as a "virtual world" or "virtual environment") of a metaverse. Each avatar can be personalized, life-like, and/or animated. Through avatars, users can collectively and simultaneously participate in specific events, be present in particular virtual places, and participate in activities with other users with individual agency. In some embodiments, avatars in the metaverse are not restricted to a single virtual platform, but instead can appear and interact with different experiences across some or all virtual platforms of the metaverse. In some embodiments, the characteristics (e.g., appearance) associated with an avatar will be maintained regardless of the virtual platform the avatar is visiting. In some embodiments, avatars can represent movement of a user through simple facial movements (e.g., nods). In some embodiments, avatars can replicate an entire user and/or their body movements to create a vivid feeling of the user being physically present in the metaverse. In some embodiments, an avatar may include or be associated with objects such as specific items of clothing and/or accessories (e.g., sport shoes or handbags) that may be generic or purchased as a non-fungible token (NFT) in the metaverse.

Each user can be associated with a primary avatar that is directed by the user (also referred to as the avatar's "owner") when accessing the metaverse to participate in one or more virtual worlds of the metaverse. As such, the primary avatar can be a live virtual representation of the associated user such that the actions of the primary avatar are defined and controlled in real-time by the user (e.g., via the user's engagement with a user input such as a device controller, touch screen, and/or keyboard). Additionally, the primary avatar provides a conduit for the user to participate in (e.g., initiate) transactions in the metaverse. For example, a primary avatar, operating under the control of the user, is able to purchase and/or sell digital goods and services (e.g., NFTs) based on the financial capabilities of (e.g., using and limited by the resources of) a virtual wallet associated with the user and/or the avatar. In some embodiments, a user can also be associated with one or more non-primary avatars, which can be referred to as automated controlled avatars, alternative online avatars, and/or cloned avatars. In contrast to the primary avatar, cloned avatars can operate semi-autonomously such that a cloned avatar can move within the metaverse virtual worlds and/or engage with other avatars and/or metaverse locations under a set of conditions (e.g., pre-programmed conditions) as controlled and operated by the avatar management systems and processes described herein.

One or more embodiments described herein include methods and/or systems for managing avatars in one or more virtual reality applications. Although embodiments described herein are described in relation to virtual reality and virtual reality applications, any of the embodiments described herein can alternatively or additionally include or be used in conjunction with augmented reality and augmented reality applications. In some implementations, a user's virtual self (e.g., a user's primary avatar) can be cloned to generate a non-primary avatar, which can be delegated to represent the user and/or the user's virtual self in or at social spaces, domains, and/or events without being actively controlled in real-time by the user. Additionally, the cloned avatar of the user's virtual self (also referred to as a "clone," "a clone avatar," an "automated controlled avatar", or an "alternative online avatar") can represent the user and/or the user's virtual self at in or at social spaces, domains, and/or events which may be concurrently-occurring with real-time activity of the user elsewhere (e.g., due to the user actively controlling the user's primary avatar or the user being offline), which is not possible in the real world. In some implementations, a cloned avatar of the user's virtual self can be associated with (e.g., share) a set of characteristics, rules, and/or properties inherited from the user's primary avatar. The set of characteristics, rules, and/or properties can be customizable by the user.

In some implementations, the user's virtual self can be cloned multiple times to generate multiple cloned avatars. In some implementations, the primary avatar and the one or more cloned avatars can be included in a set (e.g., a set organized according to a hierarchy) of avatars associated with the user in a metaverse (e.g., associated with a profile of the user), and each avatar can act as a virtual representation of the user in the metaverse (e.g., with some or all avatars acting in distinct virtual worlds of the metaverse simultaneously). Thus, a user of the metaverse may simultaneously virtually participate in and/or be represented in distinct worlds (e.g., distinct virtual reality applications) of a metaverse using the set of avatars. Additionally, using an avatar of the set of avatars, the user can virtually participate and/or be represented in a world (e.g., a virtual reality application) of a metaverse without needing to actively control the avatar through actively interacting in real-time with a user input (e.g., via physically interacting with a controller device) of a device running the virtual reality application in the real world. For example, the user can virtually participate and/or be represented in a world by a cloned avatar from the set of avatars when the user is offline and unable to actively and in real-time control the user's primary avatar. The user can also virtually participate and/or be represented in a world by a cloned avatar from the set of avatars when the user is actively controlling the user's primary avatar in real-time (e.g., for a different purpose and/or in a different world than the cloned avatar).

In some implementations, each avatar from the set of avatars can be assigned to a status (e.g., a level, category, or group) within a hierarchy of avatars of the user. For example, one or more avatars can be identified as "primary," one or more avatars can be identified as "secondary," one or more avatars can be identified as "tertiary," etc. The user (also referred to as the "owner") of the set of avatars can delegate a virtual representative for a particular task, activity, or environment from the set of avatars based on the status and/or characteristics of each avatar, which may have been previously personalized by the user. In some implementations, a hierarchy of avatars can have multiple levels, and each level can be associated with particular features, characteristics, and/or levels of autonomy of avatars assigned to all avatars of that level. For example, all avatars in the secondary level can be configured as interactive avatars and all avatars in the tertiary level can be configured as passive avatars, as described in more detail below. Thus, the user can select an avatar from the secondary or tertiary level depending on the needs of the user within the metaverse.

In some embodiments, a method, such as any of the methods described herein which can be performed by any of the systems described herein, includes receiving, at a processor, data associated with a surrounding of a first online avatar of a user in a virtual reality application. The method further includes detecting, at the processor based on the data and using a first machine learning model, a plurality of objects in the surrounding. The method further includes determining, at the processor and based on object types of the plurality of objects, a plurality of characteristics of each object from the plurality of objects. The method further includes predicting, at the processor, at least one movement parameter of each object, based on the data and the plurality of characteristics of that object. The method further includes determining, at the processor and using a second machine learning model, an action from a plurality of actions to be executed by the first online avatar within the virtual reality application, based on the at least one movement parameter of the object from the plurality of objects. The method further includes converting the action to a user command based on a controller type of a controller that the user uses to control a second online avatar of the user in the virtual reality application, and sending an instruction to effectuate, in the virtual reality application and based on the user command, the action to the first online avatar of the user without an input from the user.

In some embodiments, a non-transitory processor-readable medium, such as a non-transitory processor-readable medium associated with any of the systems and/or methods described herein, can store code representing instructions to be executed by a processor, and the code can include code to cause the processor to receive data associated with a surrounding (1) of an alternative online avatar of a user and (2) in a virtual reality application. The alternative online avatar can be configured to perform a first plurality of actions based on a plurality of pre-determined rules, and the alternative online avatar differing from a primary online avatar of the user can be configured to perform a second plurality of actions in the virtual reality application based on input of the user. Additionally, the code can include code to cause the processor to detect, based on the data, at least one object in the surrounding and to determine, based on the data, a plurality of characteristics of the at least one object. The plurality of characteristics can include at least one movement parameter of the at least one object. The code can also include code to cause the processor to determine, using a machine learning model, an action from the first plurality of actions to be executed by the alternative online avatar within the virtual reality application, based on the at least one movement parameter of an object from the plurality of objects, and to send an instruction to effectuate, in the virtual reality application, the action to the alternative online avatar of the user.

In some embodiments, a method, such as any of the methods described herein which can be performed by any of the systems described herein, includes receiving data associated with a surrounding of a first online avatar of a user in a virtual reality application. The first online avatar of the user can be an alternative online avatar configured to perform a first plurality of actions based on a plurality of pre-determined rules. The alternative online avatar can be different from a primary online avatar of the user configured to perform a second plurality of actions in the virtual reality application based on user's input. The method can further include detecting, based on the data, an activity associated with a virtual person or a virtual place in the surrounding; determining, using a machine learning model, an action from the first plurality of actions based on the plurality of pre-determine rules to be applied to the first online avatar of the user to respond to the activity; and sending an instruction to effectuate, in the virtual reality application, the action to the first online avatar of the user without an input from the user.

In some embodiments, a method, such as any of the methods described herein which can be performed by any of the systems described herein, includes receiving, at a processor, a set of controller types and a set of sensor types used with a virtual reality application. The method can also include, for each controller type from the set of controller types and each sensor type from the set of sensor types, generating, at the processor, a set of user inputs from a plurality of user inputs. Each user input from the plurality of user inputs can be converted, at the processor, to a user command from a plurality of user commands, each user command associated with at least one of a controller type from the set of controller types or a sensor type from the set of sensor types. An association can be generated, at the processor, between a set of user commands from the plurality of user commands with a primary online avatar of a user in the virtual reality application based on at least one of a controller type from the set of controller types or a sensor type from the set of sensor types associated with the user. An instruction can be sent, by the processor, to manage an alternative online avatar of the user in the virtual reality application based on the set of user commands.

FIG. 1 is an example schematic diagram illustrating a system 100, according to some embodiments. As shown in FIG. 1, the system 100 includes a first compute device such as a cloned avatar management server 101 and a second compute device such as a user device 102 configured to communicate with the cloned avatar management server 101 via a network 103.

The cloned avatar management server 101 (also referred to as an "avatar management server" or a "server") can be a compute device (or multiple compute devices) having at least one processor 111 and at least one memory 112 operatively coupled to the at least one processor 111. In some instances, the server 101 can be any combination of a hardware-based module(s) (e.g., a field-programmable gate array (FPGA), an application specific integrated circuit (ASIC), a digital signal processor (DSP), a graphics processing unit (GPU)) and/or a software-based module(s) (computer code stored in memory 112 and/or executed at the processor 111) capable of performing one or more specific functions associated with that module. In some instances, the server 101 can be a server such as, for example, a web server, an application server, a proxy server, a telnet server, a file transfer protocol (FTP) server, a mail server, a list server, a collaboration server and/or the like. In some instances, the server 101 can be a personal computing device such as a desktop computer, a laptop computer, a personal digital assistant (PDA), a smart mobile telephone, a tablet personal computer (PC), and/or so forth. In some implementations, the server 101 can perform one or more specific functions through a cloud computing platform implemented at the server 101. The details of the server 101 are described with regards to FIG. 2.

The user device 102 can be a compute device having a processor 121 and a memory 122 operatively coupled to the processor 121. In some instances, the user device 102 can be a mobile device, a tablet personal computer, a personal computing device, a desktop computer, a laptop computer, an electronic reader, a video and/or audio system integrated with a vehicle, and/or the like. The user device 102 can be any combination of a hardware-based module(s) (e.g., a field-programmable gate array (FPGA), an application specific integrated circuit (ASIC), a digital signal processor (DSP)) and/or a software-based module(s) (computer code stored in memory 122 and/or executed at the processor 121) capable of performing one or more specific functions associated with that module.

The memory 122 can be, for example, a random-access memory (RAM) (e.g., a dynamic RAM, a static RAM), a flash memory, a removable memory, a hard drive, a database and/or so forth. In some implementations, the memory 122 can include (or store), for example, a database(s), process (es), application(s), virtual machine(s), and/or other software modules (stored and/or executing in hardware) and/or hardware modules configured to execute one or more steps of a cloned avatar management process(es) as described herein, such as with regards to FIGS. 3-5. In such implementations, instructions for executing one or more steps of the cloned avatar management process(es) as described with herein (e.g., with regards to FIGS. 3-5 and/or the associated methods) can be stored within the memory 122 and executed at the processor 121. In some embodiments, the memory 122 of the user device 102 can store a cloned avatar management application 123 and one or more virtual reality applications to be executed by the processor 121.

The processor 121 can be configured to, for example, write data into and read data from the memory 122, and execute the instructions stored within the memory 122. The processor 121 can also be configured to execute and/or control, for example, the operations of other components of the user device 102 (such as a network interface card, other peripheral processing components (not shown)). In some implementations, based on the instructions stored within the memory 122, the processor 121 can be configured to execute one or more steps of the cloned avatar management process (es) as described herein, such as with regards to FIGS. 3-5. In some implementations, the processor 121 and the processor 111 can be collectively configured to execute the cloned avatar management process(es) as described herein, such as with regards to FIGS. 3-5.

In some embodiments, the user device 102 can be configured with a user interface, e.g., a graphical user interface (e.g., displaying a user interface associated with the cloned avatar management application 123). The user device 102 can be an electronic device that can communicate with the server 101 and can present information from the server to the user and/or allow the user to communicate information (e.g., requests) to the server via the user interface. For example, the user device 102 can include a web browser or a mobile application that presents the user interface to a user. In some embodiments, as shown in FIG. 1, the user device 102 can optionally include or be coupled to a user input 124, which may be included in or operatively coupled to the user interface. The user input 124 can include, for example, a physical device configured for physical interaction with the user such as a touchscreen, keyboard, mouse, joystick, motion controller, augmented or virtual reality headset, or a contact-less device such as a camera for sensing motion such as hand motion, an audio sensor (e.g., a microphone) for allowing voice control, or one or more user inputs including any combination of any number of contact-based and/or contact-less devices or devices featuring more than one input type. The user input 124 can include any suitable number of actuators (e.g., buttons and triggers), which may or may not be pressure sensitive.

In some implementations, the processor 121 can execute the cloned avatar management application 123, which may create access to one or more virtual worlds or platforms of a metaverse. In some implementations, the cloned avatar management application 123 run (i.e., executed) on the user device 102 can receive feedback from the user(s) via the user input 124 (e.g., voice or touchscreen inputs).

In some implementations, the server 101 can be configured to provide the user interface capabilities as well as the cloned avatar management capabilities (or computational resources to manage cloned avatars) to the user device 102 via the network 103 (e.g., the user device 102 can act as a thin client). The instructions for providing user interface capabilities and/or the cloned avatar management capabilities can be stored in the memory 112 and be executed by the processor 111. In some implementations, the cloned avatar management capabilities can be implemented at the processor 121 and memory 122 of the user device 102 (e.g., the user device 102 can act as a thick client), with the server 101 optionally being configured to provide the user interface capabilities to the user device 102 via the network 103. The server 101 can be communicatively coupled to additional computing devices (including processors and memories; not shown in FIG. 1), which provide the cloned avatar management capabilities to the user device 102. In these implementations, the user device 102 can request (or call) a cloned avatar management application 123 (e.g., instructions stored in the memory 112 and executed by the processor 111 and/or computing devices that provide the cloned avatar management capabilities) through an Application Programming Interface (API), such as Representational state transfer (REST), GraphQL, Simple Object Access Protocol (SOAP), Remote Procedure Call (RPC), and/or the like. The cloned avatar management application (e.g., instructions stored in the memory 112 and executed by the processor 111 and/or computing devices that provide the cloned avatar management capabilities), in some implementations, can be requested or called through directly managing requests according to the protocol (for instance HTTP, TCP, or RPC calls), or may be managed through a client library or a software development kit (SDK) installed on the user device 102.

In some implementations, the cloned avatar management capabilities (or computational resources to manage cloned avatars) provided by the cloned avatar management server 101 (or in some implementations, computing devices communicatively coupled to the server 101) can be accessed by the user device 102 over a network, intranet, internet, extranet, peer-to-peer connection, or other collection of networked computer systems. The computational resources may run on machines, virtual machines, containers, or other abstractions of computer hardware.

In some implementations, the cloned avatar management server 101 can be configured to provide the cloned avatar management application 123 via a remote cloud computing server(s) (not shown). For example, the user device 102 can access the cloned avatar management application 123 via a user interface (e.g., a web browser) installed on the user device 102. The server 101 can be configured to store instructions of the cloned avatar management application 123 in the memory 112 and the cloned avatar management application 123 can be executed by the processor 111. The cloned avatar management application 123 can communicate with a remote cloud computing server(s) (not shown) to perform analysis using the computational resources residing on the remote cloud computing server(s). The results of computation can be sent to the cloned avatar management application 123 hosted by the cloned avatar management server 101 and presented to the user interface installed on the user device 102. In some implementations, the user device 102 can communicate with a remote cloud computing server (s) (not shown) to access the cloned avatar management application 123 (for user interface and/or the like) as well as the computational resources to perform the analysis to manage cloned avatars.

Figure 2:
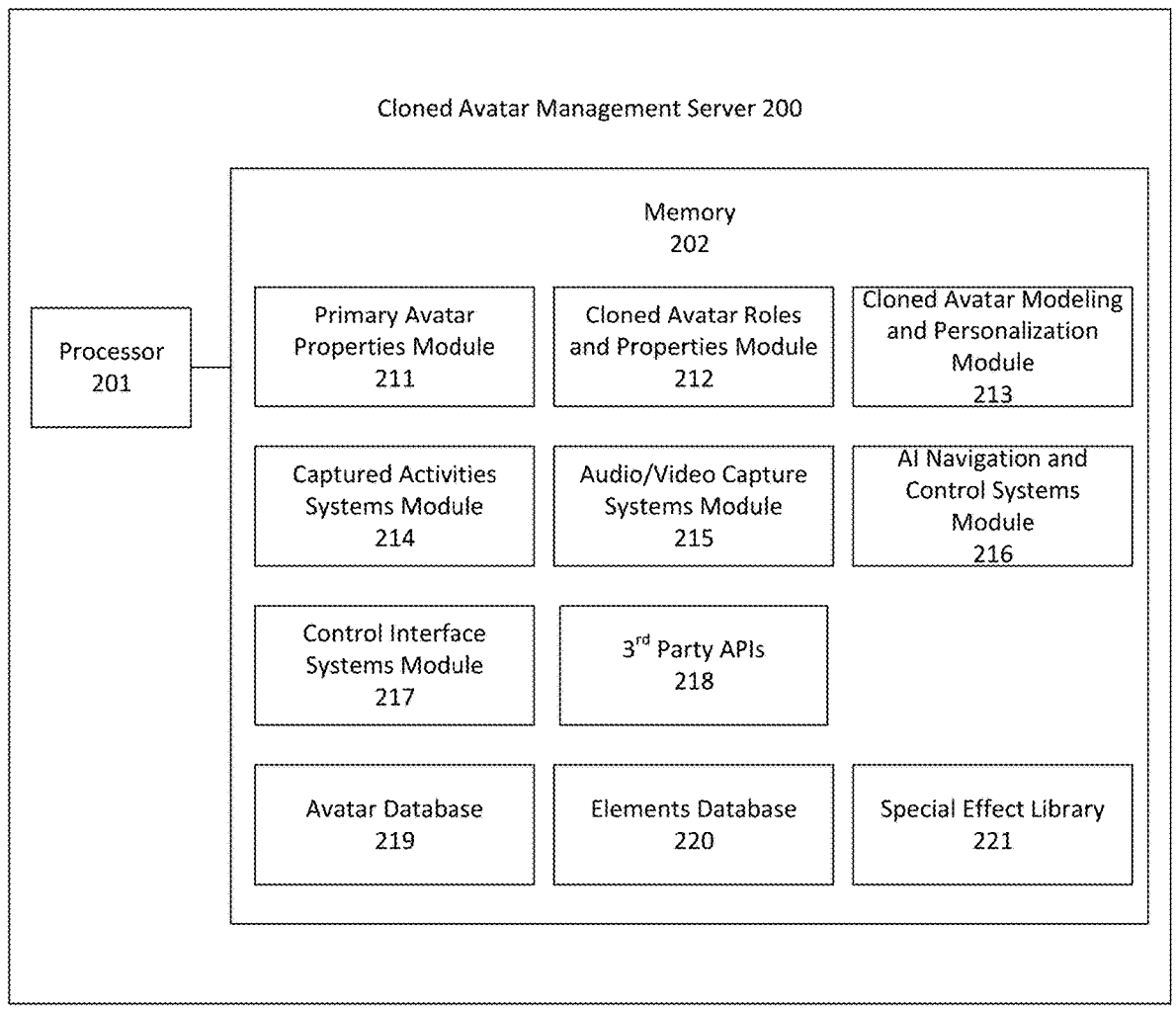
FIG. 2 is an example schematic diagram illustrating a cloned avatar management server, according to some embodiments.

FIG. 2 is an example schematic diagram illustrating a cloned avatar management server 200, according to some embodiments. The cloned avatar management server 200 is functionally and physically the same as or similar to the cloned avatar management server 101 described with regard to the system 100 and shown in FIG. 1. In some embodiments, the cloned avatar management server 201 includes a processor 201 and a memory 202 operatively coupled with the processor 201. The processor 201 and the memory 202 can be the same or similar in structure and/or function to the processor 111 and memory 112, respectively, described above with respect to FIG. 1.

The processor 201 can be configured to, for example, write data into and read data from the memory 202, and execute the instructions stored within the memory 202. The processor 201 can also be configured to execute and/or control, for example, the operations of other components of the cloned avatar management server 200 (such as a network interface card, other peripheral processing components (not shown)). In some implementations, based on the instructions stored within the memory 202, the processor 201 can be configured to execute one or more steps of the cloned avatar management process(es) as described herein, such as with regards to FIGS. 3-5.

The memory 202 can be, for example, a random-access memory (RAM) (e.g., a dynamic RAM, a static RAM), a flash memory, a removable memory, a hard drive, a database and/or so forth. In some implementations, the memory 202 can include (or store), for example, a database, process, application, virtual machine, and/or other software modules (stored and/or executing in hardware) and/or hardware modules configured to execute a cloned avatar management process(es) as described herein, such as with regards to FIGS. 3-5. In such implementations, instructions for executing the cloned avatar management process(es) and/or the associated methods can be stored within the memory 202 and executed at the processor 201.

In some implementations, the memory 202 can store data related to software code representing instructions to be executed by a processor (e.g., processor 201) and cause the processor to execute a primary avatar properties module 211, a cloned avatar roles and properties module 212, and/or a cloned avatar modeling and personalization module 213. The memory 202 can also store data related to an avatar database 219 (also referred to as a "2D/3D avatar database"), an elements database 220, and/or a special effect library 221. Moreover, the memory 202 can store data related to software code representing instructions to be executed by a processor (e.g., processor 201) and cause the processor to execute a captured activities systems module 214, an audio/video capture systems module 215, an artificial intelligence (AI) navigation and control systems module 216, a control interface systems module 217, and third party APIs 218. In some embodiments, the third party APIs 218 (or portions thereof) can be included within one or more of the primary avatar properties module 211, the cloned avatar roles and properties module 212, the cloned avatar modeling and personalization module 213, the captured activities systems module 214, the audio/video capture systems module 215, the AI navigation and control systems module 216, and/or the control interface systems module 217. In some implementations, one or more of the software program modules 211-217 can include computer-executable instructions executable by one or more computers or other devices (e.g., the user device 102 through the cloned avatar management application 123). In some implementations, the stored information of the primary avatar properties 211, the roles and properties of cloned avatars 212, the cloned avatar modeling and personalization 213, the avatar database 219, the elements database 220, the special effect library 221, and/or the third party APIs 218 can be provided to the one or more computers or other devices (e.g., the user device 102 through the cloned avatar management application 123) executing the computer-executable instructions of the software program modules 211-217 for use in executing the software program modules 211-217. Generally, software program modules include routines, programs, objects, components, data structures, etc. that perform particular tasks or implement particular abstract data types. Typically, the functionality of the program modules can be combined or distributed as desired in various embodiments.

The primary avatar properties module 211, the roles and properties of cloned avatars module 212, and/or the cloned avatar modeling and personalization module 213 can each include, for example, information input by the user and/or information associated with a profile of the user generated by the cloned avatar management server 200. The cloned avatar management server 200 can update the properties of the primary avatar via the primary avatar properties module 211 and/or the roles and properties of the cloned avatars via the cloned avatar roles and properties module 212 automatically, repeatedly, periodically, and/or in real-time as the user interacts with the server 200 via a user interface, such as a user interface of user device 102 (e.g., running a cloned avatar management application such as application 123) in communication with the server 200.

The primary avatar properties module 211 can include, for example, identify and appearance-related data, such as data associated with specific items of clothing and accessories to be included in a representation of the primary avatar in the metaverse. The cloned avatar roles and properties module 212 can include, for example, identity and appearance-related data, such as data associated with specific items of clothing and accessories to be included in a representation of the cloned avatar in the metaverse. Additionally, the cloned avatar roles and properties module 212 can include additional rules and/or conditions by which the cloned avatar operates in the metaverse. For example, the cloned avatar roles and properties module 212 can include rules governing how a cloned avatar will engage with other avatars and/or metaverse locations. In some implementations, the cloned avatar management server 200 can generate cloned avatars and/or roles and properties associated with cloned avatars using machine learning and analytics algorithms (e.g., included in or using in combination with the module 212).

In some implementations, the cloned avatar roles and properties module 212 can assign (e.g., under the control of a user and/or using machine learning and/or analytics algorithms) a passive role or mode or an interactive role or mode to a cloned avatar. In some implementations, the cloned avatar roles and properties module 212 can include rules and/or properties defining how a cloned avatar will virtually represent the user in a passive role or mode versus an interactive role or mode at any given time. Characteristics associated with the passive mode versus the interactive mode can define how a cloned avatar is represented in one or more virtual worlds, how the cloned avatar may be perceived by other users of the metaverse, and how the cloned avatar may interact with other avatars and/or locations in the metaverse. When operating in the passive mode, a cloned avatar does not interact with other avatars, but is perceivable (e.g., visible) by other users of the metaverse. Thus, for example, the module 212 can assign characteristics related to the cloned avatar's actions (e.g., movements) and appearance in the metaverse, but can assign a rule restricting the cloned avatar from interacting with other avatars. As an example, the cloned avatar can be configured to represent a particular interest of the user in a virtual world of the metaverse. In some embodiments, as discussed below with respect to the cloned avatar modeling and personalization module 213, the cloned avatar may be associated with a particular "look and feel" due to the cloned avatar's particular virtual clothes, carried accessories, and/or other virtual representations associated with the cloned avatar. Thus, in the passive mode, a cloned avatar can act as a billboard advertisement, a fashion model, and/or represent a particular profession such as a science teacher or athlete.

When operating in the interactive mode, a cloned avatar can be perceivable (e.g., visible) by other users of the metaverse and the cloned avatar can interact with other avatars. Thus, the module 212 can assign characteristics associated with the interactive mode to the cloned avatar to define how the cloned avatar can interact with avatars of other users, in addition to assigning characteristics and rules related to the avatar's appearance and/or other actions. For example, interactive mode characteristics (e.g., rules and properties) can determine what the cloned avatar can disclose about the user and what messages can be shared. Additionally, interactive mode characteristics can determine whether the cloned avatar can engage in transactions, such as financial transactions (e.g., based on the cloned avatar's digital wallet) to purchase and/or sell digital goods and/or services, and can set the boundaries and/or limitations of the transactions.

In some implementations, the characteristics of the interactive mode can define how a cloned avatar can generate or reply to queries made to and/or from another avatar in a particular proximity to a reference point (e.g., to the location of the cloned avatar). The queries may include, for example, asking for directions, introducing itself, and/or purchasing or selling digital goods and/or services. In some implementations, a cloned avatar can present information, such as by displaying the information on a billboard associated with the cloned avatar or by communicating the information via audio (e.g., speech) or text, and the cloned avatar can reply to a request from another passing-by avatar expressing a desire for more information related to the billboard by, for example, providing that information on-demand directly to the requesting avatar or directing the requesting avatar to a location where the information is available (e.g., by presenting a URL location via speech or text). In some implementations, a cloned avatar can advertise a particular profile for jobs or services, which can be selected by another interested avatar. For example, advertised content (e.g., presented via speech or text) can include "here are my skills, do you have work for me" or "I am a subject matter expert in mathematics for beginners, would you be interested in my services?"

In some implementations, a cloned avatar can automatically complete a limited set of pre-approved transactions using a digital wallet associated to the cloned avatar (e.g., associated to a profile of the cloned avatar and/or a user of the cloned avatar). For example, a cloned avatar can be programmed with a digital wallet preloaded with a certain number of digital currencies and/or virtual goods for sale, and that cloned avatar can initiate and complete transactions automatically if a predicted opportunity presents itself (e.g., a particular transaction is offered that is included within a range of pre-approved transactions). For example, a cloned avatar may purchase access to a virtual ticket concert from another avatar (e.g., a concert organizer) based on the offered price being within a pre-approved range and/or based on the access features meeting pre-set requirements. Similarly, a cloned avatar may sell virtual concert tickets to other avatars (e.g., at a pre-approved price and/or within a predetermined range of prices that may fluctuate based on factors such as time remaining before the event and factors affecting demand for tickets).

In some implementations, a cloned avatar can carry a digital asset, such as a concert ticket for sale or a purchased concert ticket. In some implementations, for example, a profile of a user that is associated (e.g., paired) with a cloned avatar includes information settings that can be applied to the cloned avatar, such as payment information, transaction limitations, and/or a dedicated cloned avatar wallet for purchasing/selling digital goods. Upon a cloned avatar agreeing to a transaction and/or completing a payment transfer with another avatar regarding transfer of a digital asset, a link to the digital asset can be transferred between the avatars to complete the trade of the digital asset. In some implementations, each cloned avatar of a set of cloned avatars associated with a user (e.g., associated with a user's profile) can have a separate wallet, with each wallet linked to the single user and activity related to the wallet's contents under control of the AI navigation and control systems module 216.

In some implementations, the interactions between avatars (e.g., between a real-time controlled avatar and a cloned avatar or between two cloned avatars) can be in the form of two-way voice communications to initiate and complete a transaction. In some implementations, for example, an avatar (e.g., a user's primary avatar or cloned avatar), seeking to sell a ticket, can initiate and/or conduct a transaction by voice. A cloned avatar and/or a system controlling the cloned avatar (e.g., a combination of the modules 214, 215, 216, and/or 217) can be configured to analyze the audio including the voice communication, determine a reply (e.g., based on assigned characteristics or rules), and present the reply (e.g., by delivering pre-recorded or dynamic content generated through a text-to-speech engine), similar to the operation of a bot conversation. In some implementations, for example, an avatar (e.g., a user's primary avatar or cloned avatar), seeking to sell a ticket, can initiate and/or conduct a transaction through written text that can be displayed and perceptible by a cloned avatar and/or a system controlling the cloned avatar. In some implementations, the cloned avatar and/or the system controlling the cloned avatar can be configured to analyze the text, determine a reply (e.g., based on assigned characteristics or rules), and present the reply (e.g., via text or selection of displayed options via pointing, clicking, touching, or speaking). The text presented by the selling avatar and/or the analysis of the text and determination of the reply by the potential purchaser cloned avatar can include analysis using a decision tree of written-based options that can be analyzed and selected by the cloned avatar and/or system controlling the cloned avatar. For example, a particular concert or a concert ticket can be selected from a list of ticket options, followed by a selection of preferences related to the ticket (e.g., a selection of a number of seats and/or a particular seating location), followed by a method of payment.

Regardless of whether cloned avatars are associated with or operating in an active or passive mode, the activities of cloned avatars can be reported back to their user based on the interactions that happened and/or are happening in their respective metaverse virtual locations. Such activities can be visualized by the user in a live or recorded "dashboard" view (e.g., on a display of a user device), such as is shown, for example, in FIG. 11. The "dashboard" view can display all interactions of each cloned avatar. In some implementations, the dashboard can include opportunities for the user to "jump/replay" into the potential opportunities that involve a higher level of presence, control, messaging, and/or feedback by the user. For example, the user can take control of a cloned avatar when desired (e.g., by selecting a "jump"

feature related to the cloned avatar), making the cloned avatar the user's primary avatar.

As described above, the memory 202 can store software code representing instructions for the cloned avatar modeling and personalization module 213. In some implementations, the processor 201 can execute the instructions of the cloned avatar modeling and personalization module 213 to manage the generation and/or storing of characteristics of the cloned avatars that are related to the look and feel of each cloned avatar. Cloned avatars of a user can be modeled based on a primary avatar of a user and can optionally be personalized by the user (e.g., based on their respective passive or active roles and/or expected activities). For example, a cloned avatar in passive mode can be personalized to include an indicator to other avatars that it has a passive role. The indicator can include, for example, a symbol "P", a carry-on sign "Passive," one or more items of clothing, and/or some other form of notification reflecting the cloned avatar's passive capabilities when in the presence of other avatars. A cloned avatar in interactive mode can be personalized to include an indicator that indicates the cloned avatar's interactive role to other avatars (e.g., based on their relative proximity to each other). The indicator can include, for example, a symbol "I", a carry-on sign "Interactive", one or more items of clothing, and/or some other form of notification(s) reflecting the cloned avatar's interactive capabilities when in the presence of other avatars.

As described above, the memory 202 can store software code representing instructions for the control interface systems module 217. In some implementations, the processor 201 can execute the instructions of the control interface systems module 217 to emulate one or more user inputs that an online user would engage with when controlling the primary avatar of the user, such as by interacting (e.g., with or without physical contact) with a physical controller device (e.g., a user input such as the user input 124) via, for example, speaking into a microphone (e.g., of a game controller or augmented reality or virtual reality headset), motioning (e.g., moving the device and/or user movement relative to a motion sensor or camera), typing on a keyboard, and/or toggling or otherwise engaging with one or more buttons, mouses, touchpads, joysticks, and/or other user inputs. The control interface systems module 217 can include a controller interface emulator and/or external tools such as postma or scripts like cURL to interact directly with a virtual reality application using an API layer (e.g., by exposing an endpoint and a listener) so that the control interface systems module 217 can control the movement and interaction of the cloned avatar in the virtual world related to the virtual reality application and, thus, in the metaverse. The control interface systems module 217 can include a library of physical controller devices (e.g., user inputs such as the user input 124) and associated data so that the control interface systems module 217 can emulate via its API layer the various inputs and types of controller devices interfacing to the virtual reality applications of the metaverse. When the user is offline, the control interface systems module 217 can control the user's cloned avatar(s) movements and actions within the metaverse. When the user is online, the control interface systems module 217 can control deployed cloned avatars of the user (e.g., in one or more respective virtual worlds or environments) while the user simultaneously controls operation of its primary avatar (e.g., in a virtual world or environment that can optionally be distinct from any virtual world or environment in which a cloned avatar of the user is deployed). A passive or active cloned avatar can provide automated voice replies to queries through, for example, a text-to-speech API, such that the cloned avatar communicates with other avatars similarly to when an online user speaks into a microphone and the recorded speech is associated with an avatar of the user (e.g., in real time) to communicate with another avatar. Thus, via the APIs of a physical user input device such as a headset or controller, the control interface systems module 217 can control navigation of, actions performed by, and content presented by a cloned avatar by emulating user input commands (e.g., actuation of buttons and/or movement triggering a motion sensor) and delivering pre-recorded or dynamic content using a text-to-speech engine.

As described above, the memory 202 can store software code representing instructions for the audio/video capture systems module 215. In some implementations, the processor 201 can execute the instructions of the audio/video capture systems module 215 to enable the owner of a cloned avatar to review the activities of a cloned avatar in real-time or delayed mode. The audio/video capture systems module 215 can include a casting interface configured to stream in real-time the view and/or action experienced by a cloned avatar (e.g., when controlled by the control interface systems module 217) to a third party device for display and/or capture. The audio/video capture systems module 215 can includes tools for extracting and deconstructing incoming frames. In some implementations, the casting interface can be embedded natively within the metaverse platform, or a video camera and microphone system can be aimed at a display screen rendering a metaverse application to capture the audio/video stream externally without an integration with the metaverse platforms. The audio/video capture systems module 215 can include an audio/video frame grabber configured to capture incoming frames of the live casting for digital processing and analysis. In some implementations, the frame grabber can sample incoming frames at a lower rate than the audio stream is captured to avoid dropping key elements of a possible conversation between a cloned avatar and another avatar (e.g., the sample rate of the audio stream can be higher than the frame rate of the video). The audio/video capture systems module 215 can include an audio/video analyzer to process the captured stream of audio/video content and pre-process it for filtering and normalization before sending to the AI navigation and control systems module 216 for processing. For video content, the analyzer normalizes the video stream by applying a set of filters, such as resolution, aspect ratio, noise filtering, contrast, brightness, blurriness, and/or other similar filters associated with image quality processing. For audio content, the analyzer normalizes the audio stream by applying a set of filters, such as noise cancellation, volume control, channel enhancement, pitch control and/or other similar filters associated with audio quality processing.

As described above, the memory 202 can store software code representing instructions of the AI navigation and control systems module 216. In some implementations, the processor 201 can execute the instructions of the AI navigation and control systems module 216 integrated into a virtual reality application associated with a world of the metaverse such that AI controls an avatar by simulating behavior of the user. For example, after the control interface systems module 217 emulates a physical interaction between the user and a user input (e.g., a physical input controller), the AI navigation and control systems module 216 can analyze the outcome of a rendering engine associated with the virtual reality application (e.g., via analyzing data captured by the audio/video capture systems module 215) to determine an effect, if any, on and/or by the avatar resulting from the emulated physical interaction, and determining what, if anything, the cloned avatar should do next. For example, the analysis and determination by the AI navigation and control systems module 216 can be based on real-time inputs from, for example, the audio/video capture systems module 215. The AI navigation and control systems module 216 can send an instruction to the controller interface systems module 217 based on the determination of what the cloned avatar should do next so that the controller interface systems module 217 can emulate a physical interaction between the user and a user input to cause the cloned avatar to take a particular action (e.g., move, respond to another avatar, etc.).

As described above, the memory 202 can store software code representing instructions for the captured activities systems module 214. In some implementations, the processor 201 can execute the instructions of the captured activities systems module 214 to capture, receive, identify, classify, and/or aggregate activity data associated with a cloned avatar. In some implementations, the captured activities systems module 214 can include features that are the same or similar to those of the audio/video capture systems module 215 and/or the AI navigation and control systems module 216 and used to capture and analyze audio and/or video content to identify activity data associated with the cloned avatar (e.g., actions performed by, interactions of, and locations associated with the cloned avatar). In some implementations, the captured activities systems module 214 can identify, analyze, and/or classify activity data based on data (e.g., audio and/or video content) collected by the captured activities systems module 214 and/or data collected and/or previously analyzed by the audio/video capture systems module 215 and/or the AI navigation and control systems module 216. The captured activities systems module 214 can classify captured activity data associated with a single event of a cloned avatar into various categories (e.g., location, interaction, actions performed, other) and the classified activity data associated with each event of a set of events associated with the cloned avatar can be aggregated to create a timeline of activities for each avatar, with the activity data of related classifications optionally being arranged (e.g., aligned) relative to a timeline axis for ease of review by a user. In some implementations, the captured activities systems module 214 can generate instructions for displaying classified and/or aggregated activity data on a reporting dashboard, such as any of the reporting dashboard described herein.

The memory 202 can store software code representing instructions to modify the user's primary avatar and/or cloned avatars based on content stored in the avatar database 219, the elements database 220, and/or the special effect library 221 (also referred to as a special effect database). These may include physical characteristics, clothing items, accessories, movements, etc. The avatar database 219 can include one or more sets of avatars and/or avatar features which can be combined with other avatar features as selected by the user to create an avatar. The avatars and/or avatar features included in the avatar database 219 can be modeled in two and/or three dimensions. At least some of the avatars and/or avatar features included in the avatar database 219 can be modeled after a human and/or animal body. The elements database 220 (also referred to as an "objects database") can be a repository of objects that can be associated with (e.g., via user selection and/or assignment) and rendered with an avatar (e.g., an avatar of the avatar database 219). The objects can include, for example, articles of clothing, merchandise, advertising, books, and/or any other items that an avatar can "wear," "carry," or otherwise be associated with in the metaverse. The special effect library 221 can include one or more sets of special effects that can be associated with (e.g., via user selection and/or assignment) an avatar (e.g., an avatar of the avatar database 219) to animate the avatar. For example, a special effect can be associated with the avatar such that the rendering of the avatar includes movement of one or more features of the avatar and/or of the avatar itself (e.g., walking movements, changes in facial expression, speech movements). In some embodiments, the avatar database 219, the elements database 220, and/or the special effect library 221 can be combined into one or database.

Figure 3:
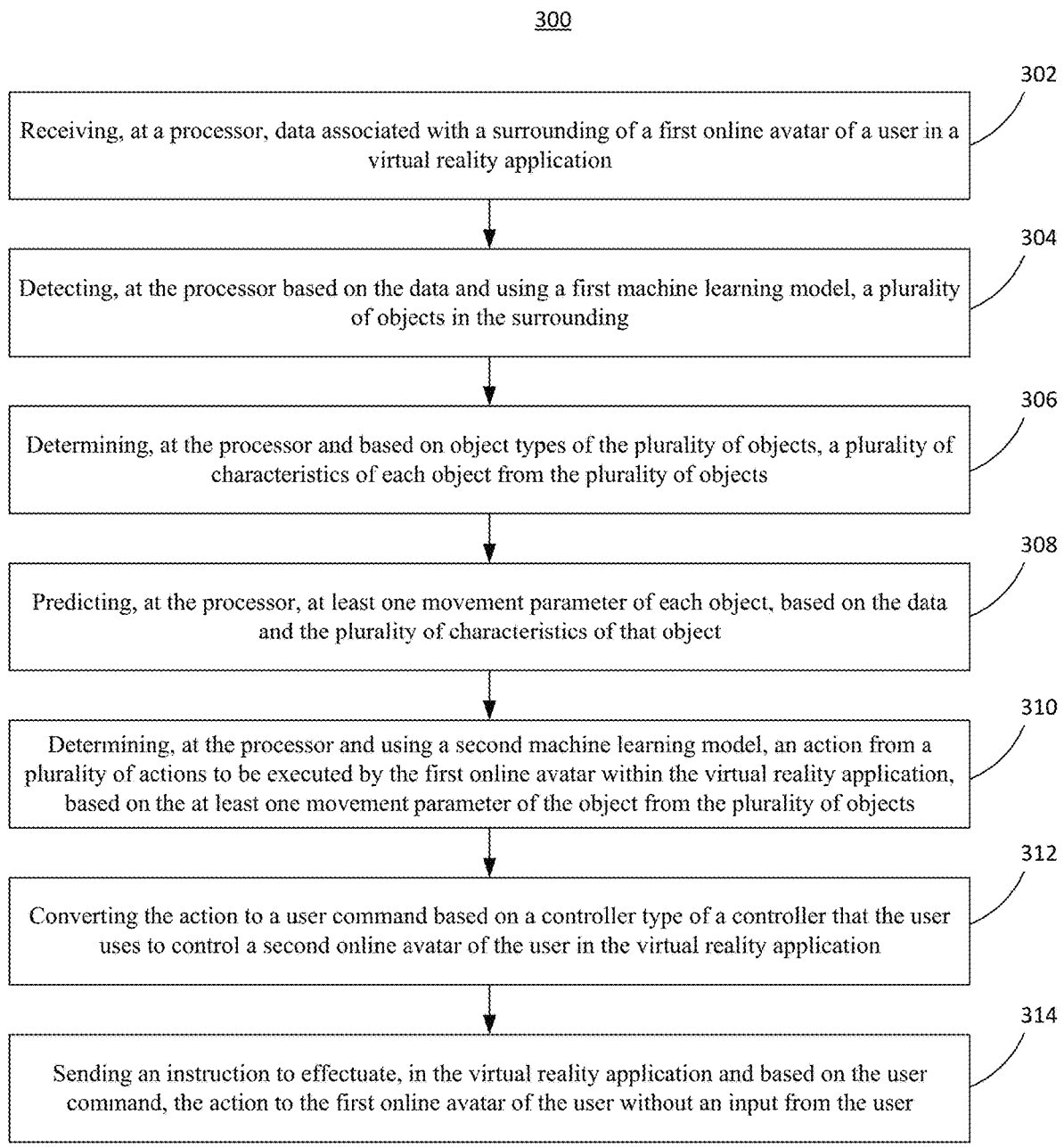
FIG. 3 illustrates a flow chart of an example cloned avatar management process, according to some embodiments.

FIG. 3 illustrates a flow chart of a cloned avatar management process 300, according to some embodiments. This cloned avatar management process 300 can be implemented at a processor and/or a memory of a cloned avatar management system such as the cloned avatar management system 100 (e.g., processor 111 or memory 112 at the cloned avatar management server 101 as discussed with respect to FIG. 1, the processor 121 or memory 122 at the user device 102 as described with respect to FIG. 1, and/or the processor 201 or memory 202 at the cloned avatar management server 200 discussed with respect to FIG. 2). For example, a non-transitory processor-readable medium can store code representing instructions to be executed by a processor, the code comprising code to cause a processor to perform the steps of the process 300.

At 302, the example cloned avatar management process 300 includes receiving, at a processor, data associated with a surrounding of a first online avatar (e.g., a cloned avatar) of a user in a virtual reality application. In some implementations, the virtual reality application can be executed by the processor. In some implementations, the processor can be a first processor and the virtual reality application can be executed by a second processor that is configured to be in communication with the first processor via a network. In some embodiments, the data associated with the surrounding of the first online avatar include at least one of video data and audio data.

The process 300 further includes, at 304, detecting, at the processor based on the data and using a first machine learning model, a plurality of objects in the surrounding. In some implementations, the plurality of characteristics of the object includes at least one of an identifier, a function, whether it stays in one location or moves, a size, a color, a current movement status, an estimated speed, and a location. In some implementations, the first machine learning model can be an object detection machine learning model. The machine learning model can include, for example, methods from one or more region-based convolutional neural networks (R-CNNs) (e.g., R-CNN, Fast R-CNN, and Faster-RCNN), methods from the You Only Look Once (YOLO) family of object recognition models (e.g., YOLOv2, YOLOv3), methods from the HydraNet network architecture template, and/or any other suitable methods or techniques.

At 306, the example cloned avatar management process 300 includes determining, at the processor and based on object types of the plurality of objects, a plurality of characteristics of each object from the plurality of objects.

At 308, the example cloned avatar management process 300 includes predicting, at the processor, at least one movement parameter of each object, based on the data and the plurality of characteristics of that object. In some implementations, the at least one movement parameter of the object includes at least one of a moving direction, a speed, and a likelihood of movement in a pre-determine time period.

In some implementations, with respect to one, some, or all of steps 304-308, for example, the machine learning model can detect objects and/or avatars located within proximity of the cloned avatar and/or within proximity of a possible or intended route of the cloned avatar, and can perform the detection based on images captured via virtual camera feeds (e.g., from the point of view of the avatar and/or from one or more points of view external to the cloned avatar that may include the cloned avatar in and/or a portion of the cloned avatar's surroundings) (e.g., using any of the audio/video capture systems described herein). In some implementations, the machine learning model can process (e.g., analyze) captured images sequentially and/or collectively. In some implementations, the machine learning model can also scan a surrounding of the cloned avatar for indicators of possible actions for the cloned avatar to execute by processing the captured images (e.g., while detecting objects and/or avatars for the cloned avatar for collision avoidance while the cloned avatar moves through the metaverse).

In some embodiments, raw captured images can be processed by a residual neural network (e.g., RegNet) that extracts multiple blocks or feature layers (e.g., in width (W) by height (H) by channel (C)) from the captured images and/or includes the multiple blocks or features layers that correspond to features of the captured images. Each extracted feature layer can have a different resolution and focus. For example, a lower layer can have a high resolution and a particular structure (e.g., link weights) associated with details in an image and a top layer can have a low resolution and a particular structure associated with a broader context in an image by using a variety of channels and having a greater channel count. The multiple feature layers can interact with one another via a weighted bi-directional feature pyramid (BiFPN). Each task of a set of tasks to be executed by the machine learning model (e.g., object detection, avatar detection, detection of indications of possible cloned avatar action) can be associated with a respective decoder trunk or detection head, which can be trained separately and can share the same neural network backbone or feature extraction mechanism. For example, the machine learning model can have the architectural layout of a HydraNet, such as is described in N. Shazeer, K. Fatahalian, W. R. Mark and R. T. Mullapudi, "HydraNets: Specialized Dynamic Architectures for Efficient Inference," 2018 *IEEE CVF Conference on Computer Vision and Pattern Recognition*, Salt Lake City, UT, USA, 2018, pp. 8080-8089, which is incorporated by reference herein in its entirety.

In some embodiments, the machine learning model can detect objects, other avatars, and/or indicators of possible actions of a cloned avatar based on multiple images by using a transformer with multi-headed self-attention. For example, a raster can be initialized with the size of the virtual-world output space (vector space). For a given pixel at a known position in the output space, the neural network can be queried to provide information about the pixel from various calibrated image capturing viewpoints (e.g., using any of the devices or systems described herein such as with respect to any of the audio/video capture systems described herein). The raw images from various viewpoints can be translated using a rectification transform (e.g., passed through a rectification layer) to correct for lack of image capturing device (e.g., camera) calibration (e.g., all of the images can be translated as if they were captured by a common virtual camera). The residual network can then receive and process the images into features at different scales and channels. The machine learning model can output a set of multicam features about the pixel that can be used for predictions. To account for time and/or movement, a transformer module of the machine learning model can generate multiscale features that are concatenated with kinematics, such as velocity and acceleration, and position tracking of the cloned avatar. Thus, the image data can be represented in vector space. These encodings can be stored in a feature queue for use by the machine learning module (e.g., by a video module, an audio/video analyzer, or an AI navigation and control system module, such as any described herein, of the machine learning model).

The features can be pushed to a time-based queue within a specified timeframe and/or a space-based queue that pushes information every time the cloned avatar travels a fixed distance (e.g., even if the cloned avatar stops moving for a period of time). The feature queue(s) can be consumed by a spatial recurrent neural network (RNN) that tracks the location of the cloned avatar and relevant objects, avatars, and/or indicators of possible cloned avatar actions and can selectively read and write to a memory or cached queue to generate a map as the cloned avatar moves about the environment. The machine learning module (e.g., the audio/video analyzer and/or the AI navigation and control system module of the machine learning module) can then continue into a branching structure of the HydraNet with trunks and heads associated with different prediction tasks and a combiner can aggregate features from multiple branches to make final predictions.

At 310, the example cloned avatar management process 300 includes determining, at the processor and using a second machine learning model, an action from a plurality of actions to be executed by the first online avatar within the virtual reality application, based on the at least one movement parameter of the object from the plurality of objects. In some implementation, the determining the action is based on a plurality of rules that specifies a set of actions from the plurality of actions allowed for the first online avatar to perform. In some implementations, the rules can be generated by AI. In some implementations, the rules can define an interaction between the first online avatar and each object of the plurality of objects and/or another online avatar in the virtual reality application. In some implementations, the rules can be specific to the first online avatar and distinct from a plurality of rules associated with a third online avatar. In some embodiments, the first machine learning model and/or the second machine learning module can be used to control movement of and/or make predictions related to a potential movement of the cloned avatar between two locations (e.g., along a straight and/or non-straight path) and, optionally, to maintain a minimum fixed distance from objects and/or other avatars based on objects and/or other avatars detected in captured images.

In some implementations, the user is offline while the processor determines the action and sends the instruction to effectuate the action. In some implementations, the second machine learning model can be a decision matrix model. In some implementations, the decision matrix model can be implemented using one or more machine learning classification models, such as models including classification algorithms such as decision tree, logistic regression, K-nearest neighbors, support vector machines (SVM), Naive Bayes, and/or neural network classification (e.g., Keras neural network).

At 312, the example cloned avatar management process 300 includes converting the action to a user command based on a controller type of a controller that the user uses to control a second online avatar (e.g., a primary avatar) of the user in the virtual reality application. In some implementations, the controller type includes at least one of a keyboard, mouse, joystick, motion controller, or virtual controller.

At 314, the example cloned avatar management process 300 includes sending an instruction to effectuate, in the virtual reality application and based on the user command, the action to the first online avatar of the user without an input from the user. For example, the instructions can be sent to effectuate the action in a manner that makes it seem as if the first online avatar is controlled by the user even without real-time user input. In some implementations, the first online avatar is an alternative online avatar configured to perform the action without the input from the user and the second online avatar is a primary online avatar controlled by the user via a plurality of inputs from the user. In some implementations, the first online avatar and the second online avatar are active simultaneously in the virtual reality application.

In some implementations, the process 300 includes providing a selection to the user to switch between the first online avatar and the second online avatar. In some implementations, the process 300 includes receiving, at the processor, data associated with a surrounding of a third online avatar of a user in a second virtual reality application and performing steps 304-314 based on the surrounding of the third online avatar.

In some implementations, for example, the process 300 can be used to detect an object in a virtual environment, identify the object to be a wall, and to control (e.g., send instructions to cause) a cloned avatar to turn left or right before walking into the wall. In some implementations, for example, the process 300 can be used to detect another avatar in close proximity to a cloned avatar, identify that the other avatar is asking a question, selling a good or service, and/or looking to buy a good or service, and then controlling (e.g., sending instructions to cause) a cloned avatar to react to the other avatar and/or interact with the other avatar. In some implementations, for example, the process 300 can be used to control (e.g., send instructions to cause) a cloned avatar to go to a virtual restaurant and order a burger to be delivered to a physical address of the cloned avatar's user (i.e., owner), which would involve a series of linear decisions to be made using the process 300 to control the traveling path and activities of the cloned avatar to move from an initial location in a virtual environment to the virtual restaurant, to enter the restaurant, to order the burger (e.g., interact with a virtual employee and/or make a virtual payment), and to optionally return to the initial location.

Figure 4:
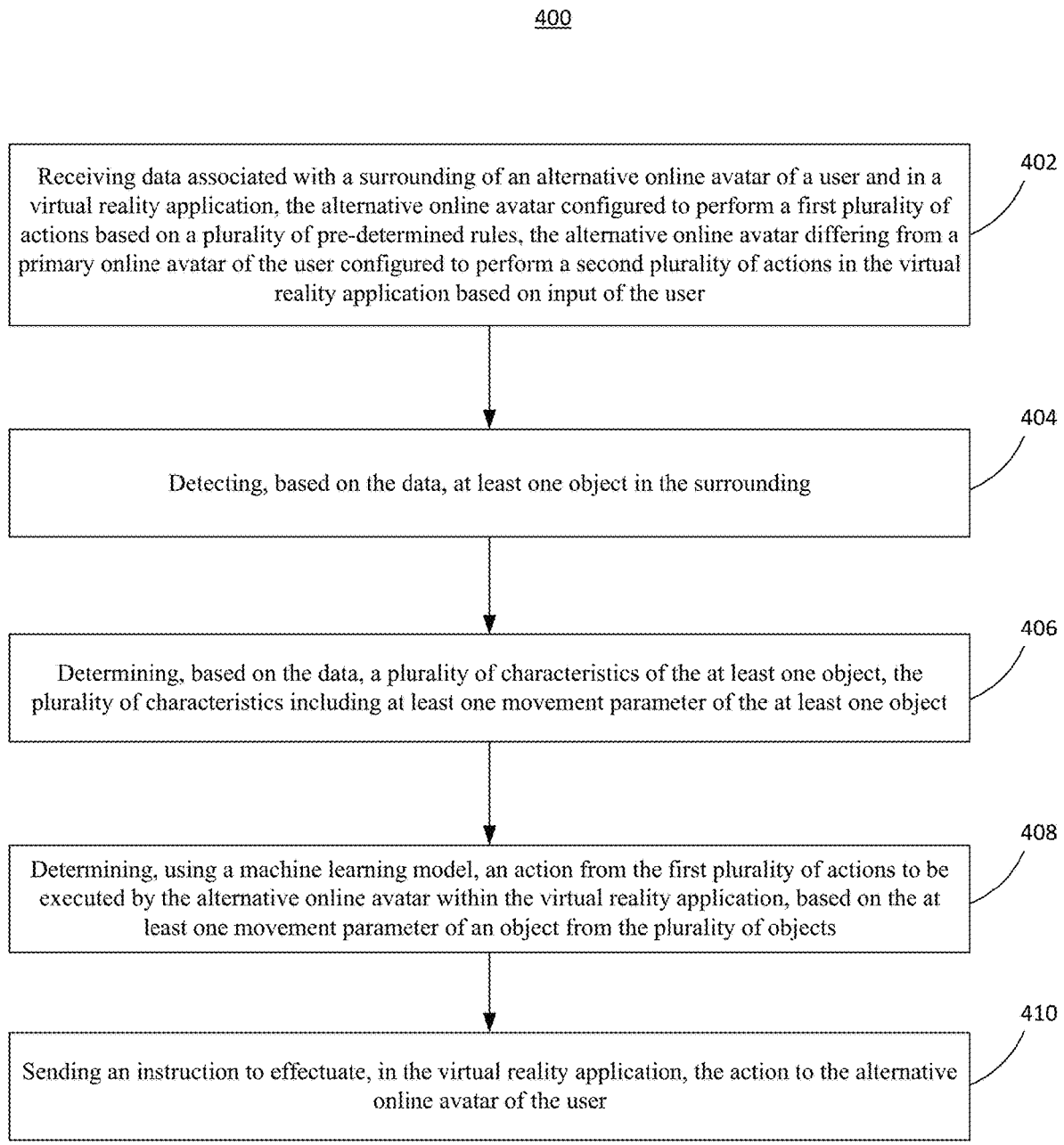
FIG. 4 illustrates a flow chart of an example cloned avatar management process, according to some embodiments.

FIG. 4 illustrates a flow chart of a cloned avatar management process 400, according to some embodiments. This cloned avatar management process 400 can be implemented at a processor and/or a memory of a cloned avatar management system such as the cloned avatar management system 100 (e.g., processor 111 or memory 112 at the cloned avatar management server 101 as discussed with respect to FIG. 1, the processor 121 or memory 122 at the user device 102 as described with respect to FIG. 1, and/or the processor 201 or memory 202 at the cloned avatar management server 200 discussed with respect to FIG. 2). For example, a non-transitory processor-readable medium can store code representing instructions to be executed by a processor, the code comprising code to cause a processor to perform the steps of the process 400.

At 402, the example cloned avatar management process 400 includes receiving, data associated with a surrounding of an alternative online avatar of a user and in a virtual reality application. The alternative online avatar is configured to perform a first plurality of actions based on a plurality of pre-determined rules. The alternative online avatar differs from a primary online avatar of the user configured to perform a second plurality of actions in the virtual reality application based on input of the user. In some embodiments, the data include at least one of video data or audio data.

The process 400 further includes, at 404, detecting, based on the data, at least one object in the surrounding.

At 406, the example cloned avatar management process 400 includes determining, based on the data, a plurality of characteristics of the at least one object. The plurality of characteristics can include at least one movement parameter of the at least one object. In some implementations, the plurality of characteristics of the object includes at least one of a name, a size, a color, a moving status, an estimated speed, or a location. In some implementations, the at least one movement parameter of the object includes at least one of a moving direction, a speed, or a likelihood of movement in a pre-determine time period.

At 408, the example cloned avatar management process 400 includes determining, using a machine learning model, an action from the first plurality of actions to be executed by the alternative online avatar within the virtual reality application based on the at least one movement parameter of an object from the plurality of objects.

At 410, the example cloned avatar management process 400 includes sending an instruction to effectuate, in the virtual reality application, the action to the alternative online avatar of the user. For example, the instructions can be sent to effectuate the action in a manner that makes it seem as if the alternative online avatar is controlled by the user even without real-time user input. In some implementations, the alternative online avatar is configured to perform the action without the input from the user and the primary avatar is controlled by the user via a plurality of inputs from the user. In some implementations, the alternative online avatar and the primary online avatar are active simultaneously in the virtual reality application.

In some implementations, the example cloned avatar management process 400 optionally includes converting the action to a user command based on a controller type of a controller that the user uses to control the primary online avatar of the user in the virtual reality application. In some implementations, the second processor is configured to provide a selection to the user to switch between the primary online avatar and the alternative online avatar.

FIG. 5 illustrates a flow chart of a cloned avatar management process 500, according to some embodiments. This cloned avatar management process 500 can be implemented at a processor and/or a memory of a cloned avatar management system such as the cloned avatar management system 100 (e.g., processor 111 or memory 112 at the cloned avatar management server 101 as discussed with respect to FIG. 1, the processor 121 or memory 122 at the user device 102 as described with respect to FIG. 1, and/or the processor 201 or memory 202 at the cloned avatar management server 200 discussed with respect to FIG. 2). For example, a non-transitory processor-readable medium can store code representing instructions to be executed by a processor, the code comprising code to cause a processor to perform the steps of the process 500.

The example cloned avatar management process 500 includes, at 502, receiving data associated with a surrounding of a first online avatar of a user in a virtual reality application. The first online avatar of the user can be an alternative online avatar configured to perform a first plurality of actions based on a plurality of pre-determined rules. The alternative online avatar is different from a primary online avatar of the user configured to perform a second plurality of actions in the virtual reality application based on user's input.

At 504, the example cloned avatar management process 500 includes detecting, based on the data, an activity associated with a virtual person or a virtual place in the surrounding.

At 506, the example cloned avatar management process 500 includes determining, using a machine learning model, an action from the first plurality of actions based on the plurality of pre-determine rules to be applied to the first online avatar of the user to respond to the activity.

At 508, the example cloned avatar management process 500 includes sending an instruction to effectuate, in the virtual reality application, the action to the first online avatar of the user without an input from the user. In some implementations, the example cloned avatar management process 500 includes converting the action to a user command based on a controller type of a controller that the user uses to control the primary online avatar of the user in the virtual reality application.

Figure 6:
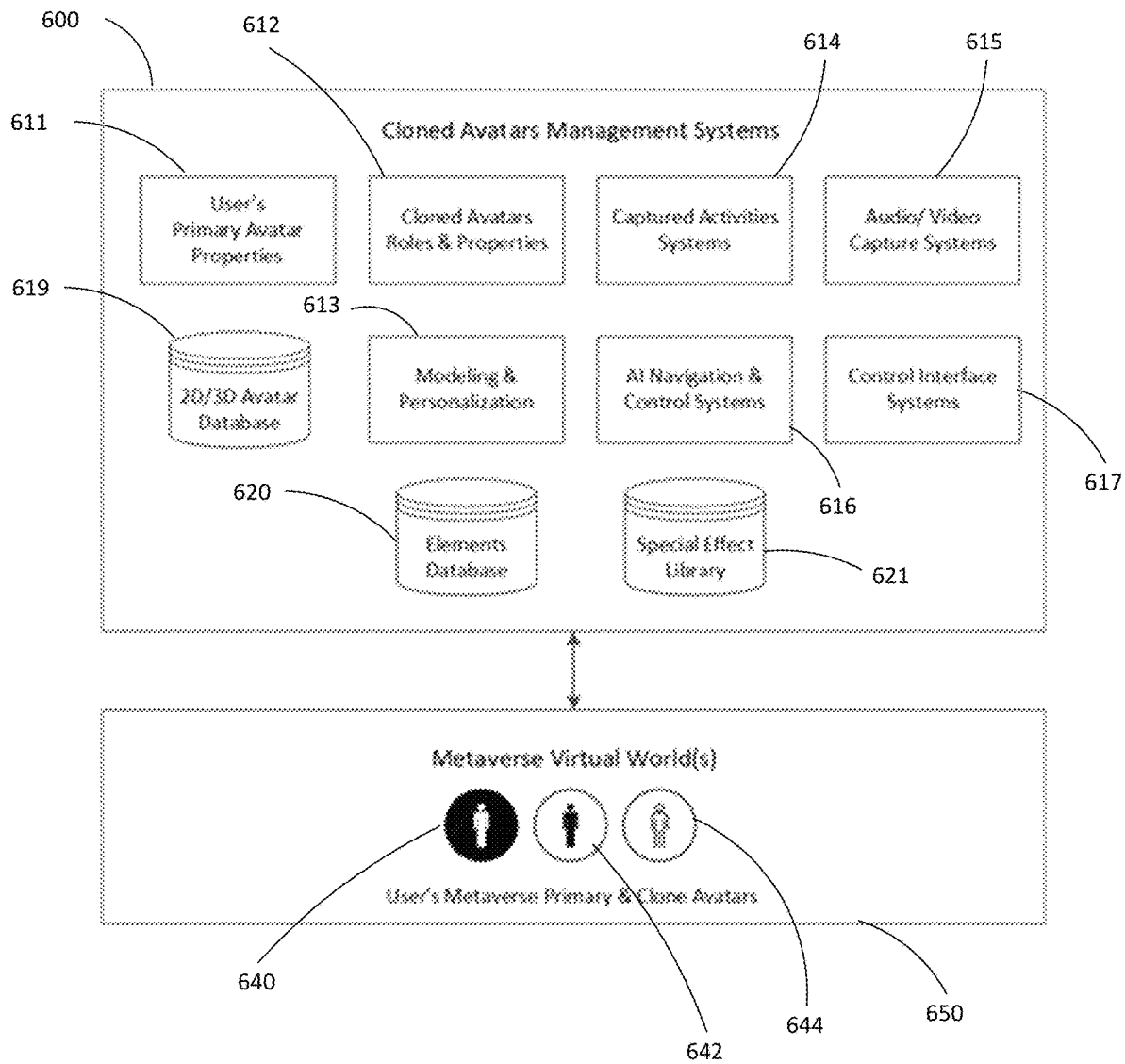
FIG. 6 is an example schematic diagram illustrating a cloned avatars management system, according to some embodiments.

FIG. 6 is a schematic illustration of a cloned avatars management system 600. The system 600 can be the same or similar in structure and/or function to any of the systems described herein, such as the system 100, the server 101, and/or the server 200. The cloned avatars management system 600 can be implemented on one or more servers and/or one or more user devices. The cloned avatars management system 600 can be configured to control the presence, actions, and movements of one or more avatars (e.g., cloned avatars) in the metaverse 650. For example, as shown in FIG. 6, the cloned avatars management system 600 can control a first cloned avatar 642 and a second cloned avatar 644 (e.g., relative to a user's primary avatar 640) in the metaverse 650. Additionally, as described in further detail herein, in some implementations a user can switch which avatar of a set of avatars is the primary avatar, and, in response, the cloned avatars management system 600 can control an avatar that was previously the primary avatar within the metaverse 650.

As shown in FIG. 6, the cloned avatars management system 600 can include a primary avatar properties module 611, a cloned avatar roles and properties module 612, a cloned avatar modeling and personalization module 613, an avatar database 619 (also referred to as a "2D/3D avatar database"), an elements database 620, and a special effect library 621. The system 600 can also include a captured activities systems module 614, an audio/video capture systems module 615, an AI navigation and control systems module 616, and a control interface systems module 617. The primary avatar properties module 611, the cloned avatar roles and properties module 612, and the cloned avatar modeling and personalization module 613 can be the same or similar in structure and/or function to the primary avatar properties module 211, the cloned avatar roles and properties module 212, and the cloned avatar modeling and personalization module 213 described with respect to FIG. 2, respectively. The avatar database 619, the elements database 620, and the special effect library 621 can be the same or similar in structure and/or function to the avatar database 219, the elements database 220, and the special effect library 221 described with respect to FIG. 2, respectively. The control interface systems module 617 can be the same or similar in structure and/or function to any of the control interface systems modules or systems described herein, such as the control interface systems module 217 described with respect to FIG. 2, the control interface system 717 described below with respect to FIG. 7, the control interface system 817 described below with respect to FIG. 8, and/or the control interface system 917 described below with respect to FIG. 9. The captured activities systems module 614 can be the same or similar in structure and/or function to any of the captured activities systems modules or systems described herein, such as the captured activities systems module 214 described with respect to FIG. 2, the captured activities system 714 described below with respect to FIG. 7, the captured activities system 814 described below with respect to FIG. 8, and/or the captured activities system 914 described below with respect to FIG. 9. The audio/video capture systems module 615 can be the same or similar in structure and/or function to any of the audio/video capture systems modules or systems described herein, such as the audio/video capture systems module 215 described with respect to FIG. 2, the audio/video capture systems 715 described below with respect to FIG. 7, the audio/video capture systems 815 described below with respect to FIG. 8, and/or the audio/video capture systems 915 described below with respect to FIG. 9. The AI navigation and control systems module 616 can be the same or similar in structure and/or function to any of the AI navigation and control systems modules or systems described herein, such as the AI navigation and control systems module 216 described with respect to FIG. 2, the AI navigation and control systems 716 described below with respect to FIG. 7, the AI navigation and control systems 816 described below with respect to FIG. 8, and/or the AI navigation and control systems 916 described below with respect to FIG. 9. Similarly as described with respect to the server 200 and/or the system 100, in some implementations, the system 600 can include code stored in one or more memories executable by one or more processors, as well as data included in databases stored in the one or more memories, such that the system 600 can perform the functions associated with the modules 611-617.

Figure 7:
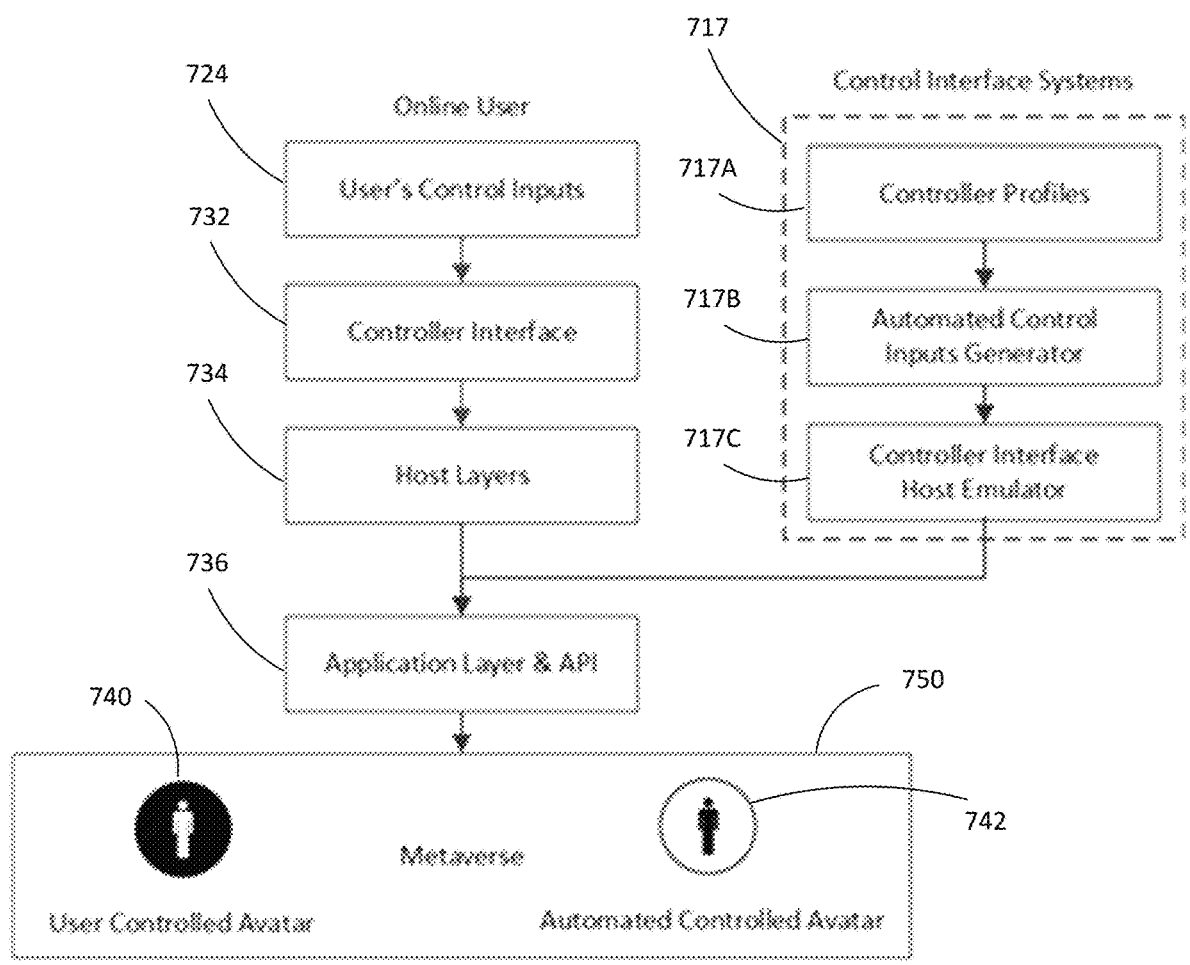
FIG. 7 is an example schematic diagram illustrating a system including control interface system(s), according to some embodiments.

FIG. 7 is a schematic illustration of a system 700 including a control interface system 717 (also referred to as a "control interface system module" or "control interface systems"), according to an embodiment. The system 700 can be the same or similar in structure and/or function to any of the systems described herein. For example, the control interface system 717 can be the same or similar in structure and/or function to the control interface systems module 217 and/or the control interface systems module 617 shown and described with respect to the server 200 in FIG. 2 and the system 600 in FIG. 6, respectively. The system 700 including the control interface system 717 can control one or more avatars relative to the metaverse 750, such as the user controlled avatar 740 (e.g., the user's primary avatar) and the automated controlled avatar 742 (also referred to as a cloned avatar or an alternative online avatar). For example, the user controlled avatar 742 can be directly controlled by the user in real-time using user input(s) 724 (also referred to as the user's control inputs) and the automated controlled avatar 742 can be controlled by the control interface system 717, which can emulate the user input(s) of a user when communicating with a metaverse platform application to control the automated controlled avatar 742. The control interface system 717 can provide the logic needed to emulate the user input(s) 724 associated with a user's operation of a physical controller such that one or more avatars can be controlled without the user operating the physical controller.

When a user is offline, the control interface system 717 can drive the movements and actions of that user's cloned avatar(s) within the metaverse. When the user is online, the control interface system 717 allows the user to optionally deploy one or more cloned avatars by driving the movement and actions of the cloned avatars while the user operates a primary avatar of the user in real-time.

As shown in FIG. 7, the system 700 includes one or more control inputs 724 of the user, a controller interface 732, host layers 734, and an application layer and API 736. The system 700 is configured to control the user controlled avatar 740 (e.g., under real-time control of the user) and one or more automated controlled avatars 742 relative to a metaverse 750. The control inputs 724 can include, for example, a physical controller device such as a keyboard, a mouse, a joystick, and/or a motion controller and/or a virtual controller such as a control device or system configured for hand control (e.g., using a camera of a device such as a front camera), a control system configured for voice control (e.g., using a microphone), and/or any combination of physical and virtual controllers. In some implementations, the system 700 can exclude one or more of the user inputs 724, the controller interface 732, and/or the host layers 734, but instead can be operatively couplable to one or more of the user inputs 724, the controller interface 732, and/or the host layers 734.

In some implementations, the range (e.g., number and type) of inputs of a physical controller is determined by the type and number of inputs (e.g., active buttons) integrated into the physical controller (e.g., into a hand-held device). For example, a joystick can integrate a lever for controlling the movement of a cursor or pointer relative to an application (e.g., as displayed on a display screen) to support forward, left, right, backward, up, down, diagonal, and/or lateral movements. In some implementations, a joystick can integrate one or more buttons, also known as triggers, to support actions from the user mapped into the application (e.g., opening a menu or selecting an item). In some implementations, controllers (e.g., video game controllers) include multiple joysticks, push buttons and/or pressure-sensitive buttons or triggers that can be engaged by the user to support a large variety of commands and actions relative to an application. In some implementations, controllers (e.g., Xbox® or PS4® controllers) can also include one or more sensors such as sensors configured for one or more of motion, voice, and/or audio capabilities to support interactivity with an application.

As shown in FIG. 7, the control interface system 717 includes one or more controller profiles 717A, an automated control inputs generator 717B, and a controller interface host emulator 717C. The control input(s) 724 are interfaced to the controller interface 732, which is a physical layer. The controller interface 732 can manage hardware components and can communicate with the host layers 734 and API 736 such that engagement of a user with the control inputs 724 can be relayed to the metaverse application to control movement and activity of the user controlled avatar 740 within the metaverse 750.

The API layer 736 is below the metaverse application. In some implementations, the API layer 736 can be the same layer that the metaverse application uses to interact with the application services. The controller interface host emulator 717C, external tools such as postma, and/or scripts like cURL can interact directly with the application services via an exposed endpoint and a listener of the API 736 such that the control interface system 717 can control the movement and/or interactions of the automated controlled avatar(s) 742 in the metaverse 750.

The controller profiles 717A can include a library of user inputs (also referred to as control inputs) (e.g., controller devices) and characteristics thereof stored as controller profiles. The automated control inputs generator 717B can generate input data based on one or more controller profiles to emulate a user interaction with control inputs 724. The automated input data generated by the automated control inputs generator 717B can be sent to the API layer 736 using the controller interface host emulator 717C such that the automated controlled avatar(s) 742 can be controlled within the metaverse 750 based on the automated input data generated by the automated control inputs generator 717B. In some implementations, the control interface systems 717 can generate input data to emulate a user interaction with control inputs 724 based on instructions received from AI navigation and control systems, such as any of the AI navigation and control systems or AI navigation and control systems modules described herein.

For example, in some implementations, a method or process can include receiving, at a processor (e.g., at a processor including the controller profiles 717A), a set of controller types and a set of sensor types used with a virtual reality application. For each controller type from the set of controller types and each sensor type from the set of sensor types, a set of user input data from a plurality of user input data can be generated at the processor. Each set of user input data from the plurality of user input data can be converted, at the processor, to a user command from a plurality of user commands. Each user command can be associated with at least one of a controller type from the set of controller types or a sensor type from the set of sensor types. An association between a set of user commands from the plurality of user commands with a primary online avatar of a user in the virtual reality application can be generated, at the processor (e.g., at a processor including the automated control inputs generator 717B), based on at least one of a controller type from the set of controller types or a sensor type from the set of sensor types associated with the user. An instruction to manage an alternative online avatar of the user in the virtual reality application based on the set of user commands can be sent by the processor (e.g., by a processor including the controller interface host emulator 717C) (e.g., to the API layer 736). Such a method can be implemented at a processor and/or a memory of a cloned avatar management system (e.g., using the control interface systems module 717) such as the cloned avatar management system 100 (e.g., processor 111 or memory 112 at the cloned avatar management server 101 as discussed with respect to FIG. 1, the processor 121 or memory 122 at the user device 102 as described with respect to FIG. 1, and/or the processor 201 or memory 202 at the cloned avatar management server 200 discussed with respect to FIG. 2). For example, a non-transitory processor-readable medium can store code representing instructions to be executed by a processor, the code comprising code to cause a processor to perform the steps of the method for emulating physical interaction of a user with a user input.

Figure 8:
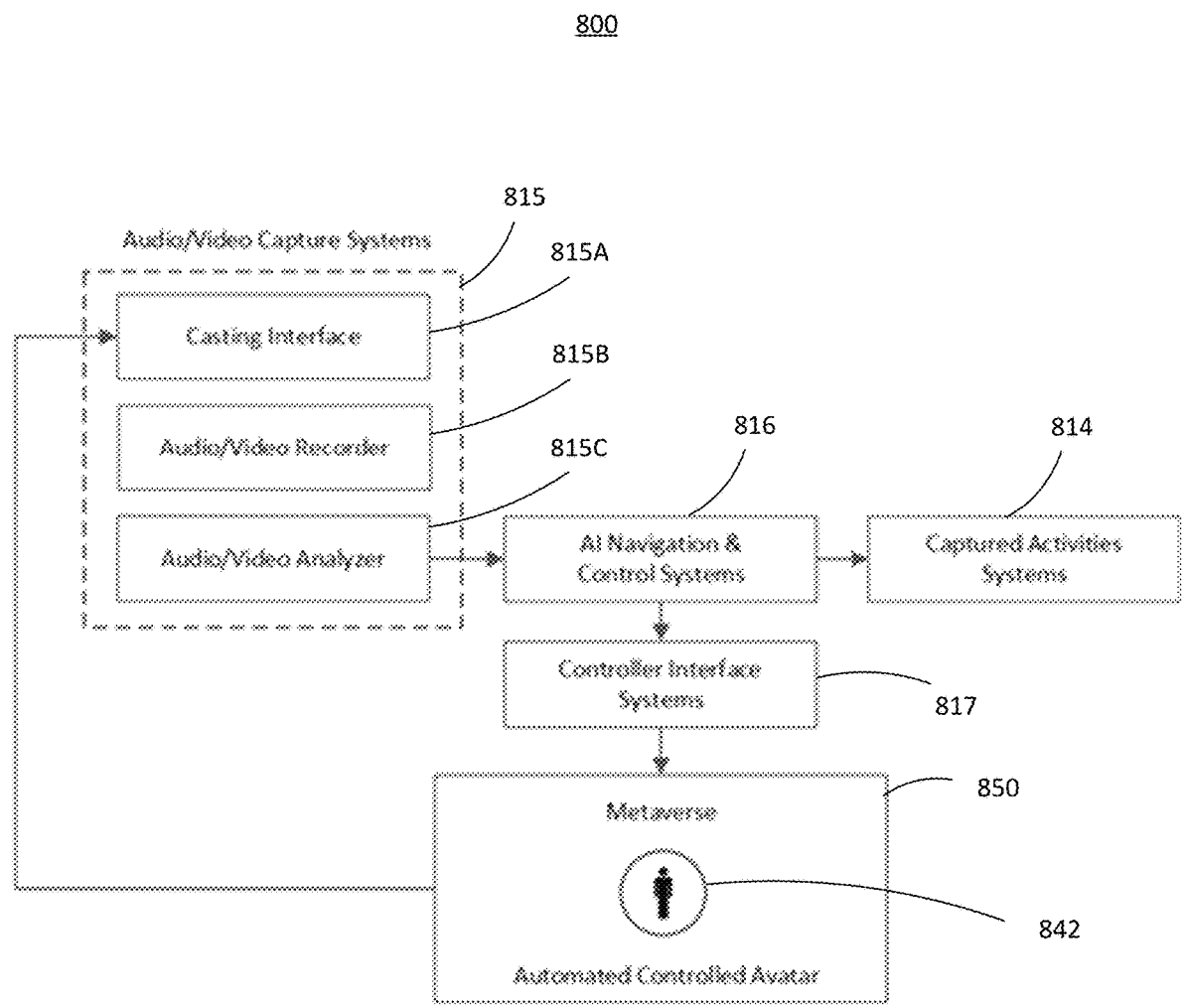
FIG. 8 is an example schematic diagram illustrating a system including audio/video capture system(s), according to some embodiments.

FIG. 8 is a schematic illustration of a system 800 including an audio/video capture system 815 (also referred to as an "audio/video capture system module" or "audio/video capture systems"), according to an embodiment. The system 800 can be the same or similar in structure and/or function to any of the systems described herein. For example, the audio/video capture system 815 can be the same or similar in structure and/or function to the audio/video capture systems module 215 and/or the audio/video capture systems module 615 shown and described with respect to the server 200 in FIG. 2 and the system 600 in FIG. 6, respectively. The system 800 including the audio/video capture system 815 can enable the user (e.g., owner) of an automated controlled avatar 842 (also referred to as a cloned avatar) to review the activities of the automated controlled avatar 842 in real-time and/or delayed mode. The system 800 also includes captured activities systems 814, AI navigation and control systems 816, and controller interface systems 817 that can be the same or similar in structure and/or function to the captured activities systems module 214, AI navigation and control systems module 216, and control interface systems module 217, respectively, shown and described with respect to the server 200 in FIG. 2.

As shown in FIG. 8, the audio/video capture system 815 includes a casting interface 815A, an audio/video recorder 815B (also referred to as an audio/video frame grabber), and an audio/video analyzer 815C. The casting interface 815A is configured to stream the view and/or action experienced from or by the automated controlled avatar 842 in the metaverse 850 to a third party device in real-time for the third-party device to display and capture. For example, the casting interface 815A can be configured to stream the view and/or action related to the automated controlled avatar 842 when controlled by a control interface system module such as any of the control interface system modules described herein (e.g., the control interface system 717). In some implementations, the casting interface 815A can stream the view and/or action experienced from or by the automated controlled avatar 842 to multiple devices to be displayed on multiple screens simultaneously. In some implementations, the casting interface 815A can be included in (e.g., embedded natively within) a platform of a metaverse 850, as in Meta Quest® for example. In some embodiments, the casting interface 815A can be configured to capture the real-time stream from an external video camera and/or a microphone system pointed towards a display screen rendering a metaverse application. Thus, the casting interface 815A can capture the activities of the automated controlled avatar 842 with or without an integration with a platform of a metaverse 850.

The audio/video recorder 815B can capture incoming frames of the live stream cast by the casting interface 815A for digital processing and analysis. In some implementations, the audio/video recorder 815B can sample the incoming frames at a lower frame rate than the sample rate of the incoming stream because the automated controlled avatar 842 is usually walking or running in the virtual world(s) of the metaverse 850, limiting the need for high-speed frame rate analysis. For example, the incoming stream can run at a minimum of 30 frames per second and up to 4K pixel resolution, and the frame grabber of the audio/video recorder 815B can sample the incoming frames at a much lower frame rate and/or lower resolution. By contrast, the audio/video recorder 815B can capture the audio stream in real-time to avoid missing (e.g., dropping) key elements of a possible conversation between an automated controlled avatar and another avatar in the metaverse 850.

The audio/video analyzer 815C can process the captured stream of audio/video content and pre-process the captured stream for filtering and normalization before sending the filtered and normalized data to the AI navigation & control systems 816 for processing. For video content, the audio/video analyzer 815C can normalize the video stream by applying a set of filters, such as resolution, aspect ratio, noise filtering, contrast, brightness, blurriness, and/or other similar filters associated with image quality processing to the captured frames of the video stream. For audio content, the audio/video analyzer 815C can normalize the audio stream by applying a set of filters, such as noise cancellation, volume control, channel enhancement, pitch control and/or other similar filters associated with audio quality processing to the captured audio data.

As shown in FIG. 8, the audio/video capture system 815 can send data from the audio/video analyzer 815C (e.g., normalized audio and/or video streams) to the AI navigation and control system module 816, which can send instructions to the controller interface system module 817 regarding movements and/or actions of the automated controlled avatar 842. The controller interface system module 817 can emulate a user input (e.g., a hardware and/or software based user input) to communicate with a metaverse application to control a movement and/or action of the automated controlled avatar 842 within the metaverse 850 based on the instructions from the AI navigation and control system module 816. Additionally, the AI navigation and control system module 816 can send data to the captured activities system module 814.

Figure 9:
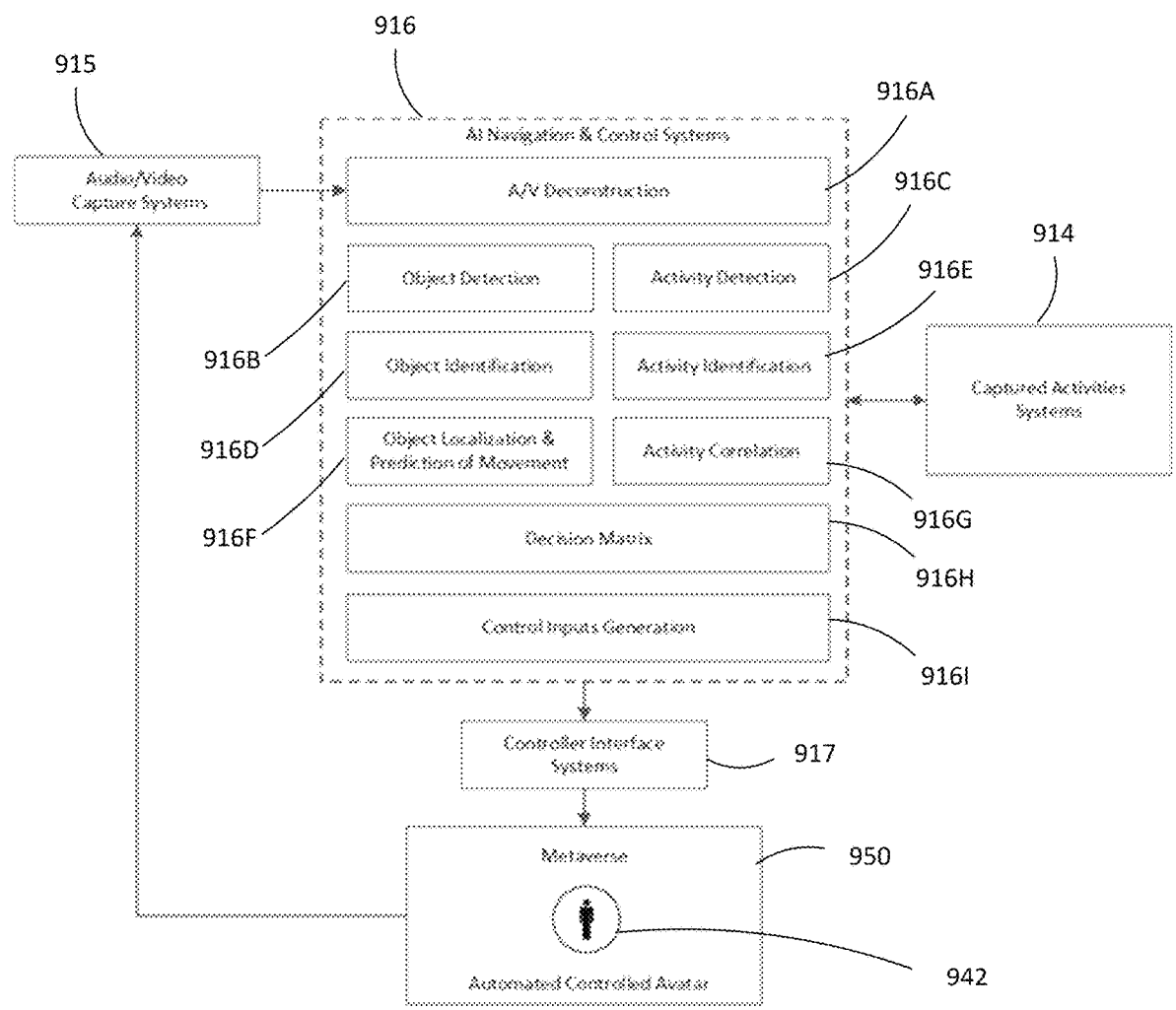
FIG. 9 is an example schematic diagram illustrating a system including AI navigation and control system(s), according to some embodiments.

FIG. 9 is a schematic illustration of a system 900 including an AI navigation and control system 916 (also referred to as an "AI control and behavior system," "AI navigation and control systems," and an "AI navigation and control systems module"), according to an embodiment. The system 900 can be the same or similar in structure and/or function to any of the systems described herein. For example, the AI navigation and control system 916 can be the same or similar in structure and/or function to the AI navigation and control systems module 216 and/or the AI navigation and control systems module 616 shown and described with respect to the server 200 in FIG. 2 and the system 600 in FIG. 6, respectively. The system 900 also includes captured activities systems 914, an audio/video capture system 915, and controller interface systems 917 that can be the same or similar in structure and/or function to the captured activities systems module 214, audio/video capture systems module 215, and control interface systems module 217, respectively, shown and described with respect to the server 200 in FIG. 2. As shown in FIG. 9, the AI navigation and control system 916 includes an audio/video (A/V) deconstruction module 916A, an object detection module 916B, an activity detection module 916C, an object identification module 916D, an activity identification module 916E, an object localization and prediction of movement module 916F, an activity correlation module 916G, a decision matrix module 916H, and a control inputs generation module 916I.

In a typical sequence of events for a user to control motion of an avatar in a videogame or in the metaverse (i.e., direct control of an avatar in real time), the user presses a button on an input controller to cause the avatar to move forward. In response to being pressed, the button completes a circuit causing the input controller to send data resulting from the circuit completion to a device (e.g., a console or computer) running an application associated with the avatar. A controller chip of the device can process the data and forward it to the videogame or metaverse application logic. The application logic can determine what the appropriate action is based on the data received (e.g., to move the avatar forward). The application logic can analyze all factors related to the movement associated with the data received (e.g., shadows, collision models, change of viewing angle). In response, the application logic can send new coordinates for the avatar (e.g., for the avatar's skeleton) and any other changes to the rendering engine associated with the application. The rendering engine can render the scene with new polygons for each affected object (e.g., can redraw the scene about 60 times each second) such that the user sees the avatar move forward on a display screen associated with the application.

Unlike in a videogame in which the AI is integrated in the application, controls an avatar, determines what movement, if any, the avatar should do, and interfaces directly with game logic to complete or modify the movement based on the application logic, in the system 900 the AI controlling the avatar motion is separate from the video game/metaverse application within which the avatar moves. The AI effectively controls an avatar in a remote control-like mode, simulating behavior of the user by emulating the input controller (e.g., in conjunction with the controller interface systems 917) and analyzing the outcome of the rendering engine to decide next steps (e.g., based on data provided by the audio/video capture systems 915). The process is somewhat like the control of a self-driving car, with the car-embedded computer controlling the steering wheel based on real-time inputs captured by external cameras capturing the local environment of that car, but the local environment of the avatar is virtual rather than physical.

To control motion of an automated controlled avatar 942, the A/V deconstruction module 916A can process (e.g., deconstruct) audio and video received and previously normalized by the audio/video capture systems 915. For video, the A/V deconstruction 916A can deconstruct the normalized video frames by generating wire frames of objects, shapes, and forms appearing in the field of view of the video frames. In some implementations, the A/V deconstruction 916A can also identify and extract text content from video frames, such as, for example, text that can be seen on street signs, branding and logos, business names, names of nearby avatars, locations, objects for sale/purchase, and text-based communication forms presented by sources that do not communicate with only audio. Such text can be included in the deconstructed video frames generated by the A/V deconstructions module 916A.

The object detection module 916B can detect the presence of objects or sets of objects in the deconstructed video frames generated by the A/V deconstruction module 916A. For example, the object detection module 916B can detect the presence of sets of objects in wire frames generated by the A/V deconstruction module 916A. Objects can be defined as geometric shapes classified against objects in a known objects library. For example, the shapes can include an avatar, a car, a building crossroad, a tree, a pet, a street sign, and/or a brand. In some implementations, the objects or sets of objects can include text in the deconstructed video frames, and the object detection module 916B can detect the presence of the text.

The object identification module 916D can analyze the objects detected by the object detection module 916B within a frame or set of frames and identify the detected objects based on their initial classification. For example, the objects associated to an avatar, car, building, crossroad, tree, pet, street sign, and/or brand can be further processed to identify as many properties as possible, such as the objects' name, writing, color, size, breed, moving status, estimated speed, and/or other relevant information. Additionally, the object identification module 916D can analyze any detected text to identify the specific content of the text. Thus, the objects associated to an avatar can include, for example, text-based descriptions, references, and/or communications between avatars.

The object localization and prediction of movement module 916F can determine a location of each identified object within the field of view of an automated controlled avatar 942 and assess their likelihood of movement. For example, the object localization and prediction of movement module 916F can identify a likelihood of movement and/or a likely speed of each identified object ranging from not capable of movement (e.g., in the case of a building or a tree), to slow movement (e.g., an avatar), to fast movement (e.g., car). Additionally, the object localization and prediction of movement module 916F can determine the specific area of the metaverse 950 in which the captured objects were identified. For example, object localization and prediction of movement module 916F can compare background scenes, correlate street names, and/or track known movement of the automated controlled avatar 942 against a mapped environment of the metaverse 950 to identify matches. By analyzing successive video frames, object localization and prediction of movement module 916F can predict the direction and/or amount (e.g., speed) of movement of a moving object, which can be shared with the decision matrix module 916H.

The decision matrix module 916H can analyze the static and moving objects (e.g., based on their associated prediction of movement predicted by the object localization and prediction of movement module 916F) to determine a future (e.g., next) movement of the automated controlled avatar 942. For example, the decision matrix module 916H can decide to maintain the automated controlled avatar 942 in the same location within the metaverse 950 or to move the automated controlled avatar 942 within the metaverse 950. The decision matrix module 916H can determine a direction (e.g., forward, back, left, right, up, down) and speed (e.g., slow, fast) for movement of the automated controlled avatar 942. The control inputs generation 916I can translate the output of the decision matrix module 916H (e.g., the directional command and/or speed or distance command) into comparable instructions for the controller interface systems 917 to execute and provide those instructions to the controller interface systems 917.

To control activity of an automated controlled avatar 942, the activity detection module 916C can automatically detect activities (e.g., activities of cloned avatars operating in the metaverse 950) present in the audio and/or video data captured by the audio/video capture system 915. The activities can include, for example, activities originating from other avatars that may want to interact with the automated controlled avatar 942 and/or are triggered by proximity to known metaverse 950 locations (e.g., a store or a movie theater). For video data, the A/V deconstruction module 916A can deconstruct normalized frames received from the audio/video capture systems 915 to detect possible activities. For audio data, the A/V deconstruction module 916A can deconstruct audio data captured by the audio/video capture systems 915 (e.g., a captured audio stream), if any, into text by applying a speech-to-text engine. In some implementations, for example, the audio content captured by the audio/video capture system 915 can include voice queries received by a cloned avatar.

The activity identification module 916E can identify activities and/or possible activities based on the activity detected in the deconstructed audio/video data by the activity detection module 916C. For video data, the activity identification module 916E can identify possible activities that are likely to be generated from other avatars or from proximity to a known location. For audio data, the activity identification module 916E can process the text content generated by the activity detection module 916C to detect relevant keywords, sentences, and other audio content that may be associated with an activity. For example, the activity identification module 916E can detect the phrase "Question is asked and this is the question."

The activity correlation module 916G can correlate the activity detected by the activity identification module 916E with the roles and/or capabilities of an automated controlled avatar 942. For example, unlike a passive avatar that is not going to respond to any detected activities, an interactive avatar (e.g., an interactive automated controlled avatar 942) can respond based on the range of capabilities defined by its owner preferences. For example, a job seeker avatar can query a job provider avatar, which can trigger a correlated activity so that the job provider avatar can reply to the query based on the programmed set of activities for the job provider avatar (e.g., "here is the job listing," "details about the company," or "skillset required"). In some implementations, a job seeker avatar may reply to a query by a job provider avatar by replying "here is my resume" or "here is my profile information." In some implementations, an automated controlled avatar 942 can advertise a product or service, and another avatar can query the automated controller avatar 942 for more information. The query from the other avatar can trigger specific pre-programmed activities of the automated controlled avatar 942 such as, for example, "here is the product info" or "here is where you can get more information."

The decision matrix module 916H can include an activity decision matrix module to decide how an automated controlled avatar 942 is to respond to a detected activity. The decision matrix module 916H may decide that the automated controlled avatar 942 will not respond to a detected activity or may decide that the automated controlled avatar 942 will respond and determine the format, type, and content of the activity that the automated controlled avatar 942 will perform as the response. For example, the decision matrix module 916H can determine that the automated controlled avatar 942 will respond by performing one or more pre-programmed physical movements, such as, for example, by performing a "thumbs up" or a "simple dance," or by executing one or more pre-programmed commands such as, for example, "share my profile," "this is the time of the day," or "share my resume." In some implementations, the decision matrix module 916H can determine that the automated controlled avatar 942 will respond using a text-to-speech engine to transform a text response generated by the decision matrix module 916H into speech, similar as if the user was talking into a microphone of a controller device associated with an avatar in real-time. For example, the decision matrix 916H can determine that the automated controlled avatar 942 will say "hello I am a cloned avatar of John, nice to meet you." The control inputs generation module 916I can translate the output of the activity decision matrix of the decision matrix module 916H (e.g., an activity command) into comparable instructions for the controller interface systems 917 to execute and provide the instruction to the controller interface systems 917.

Figure 10:
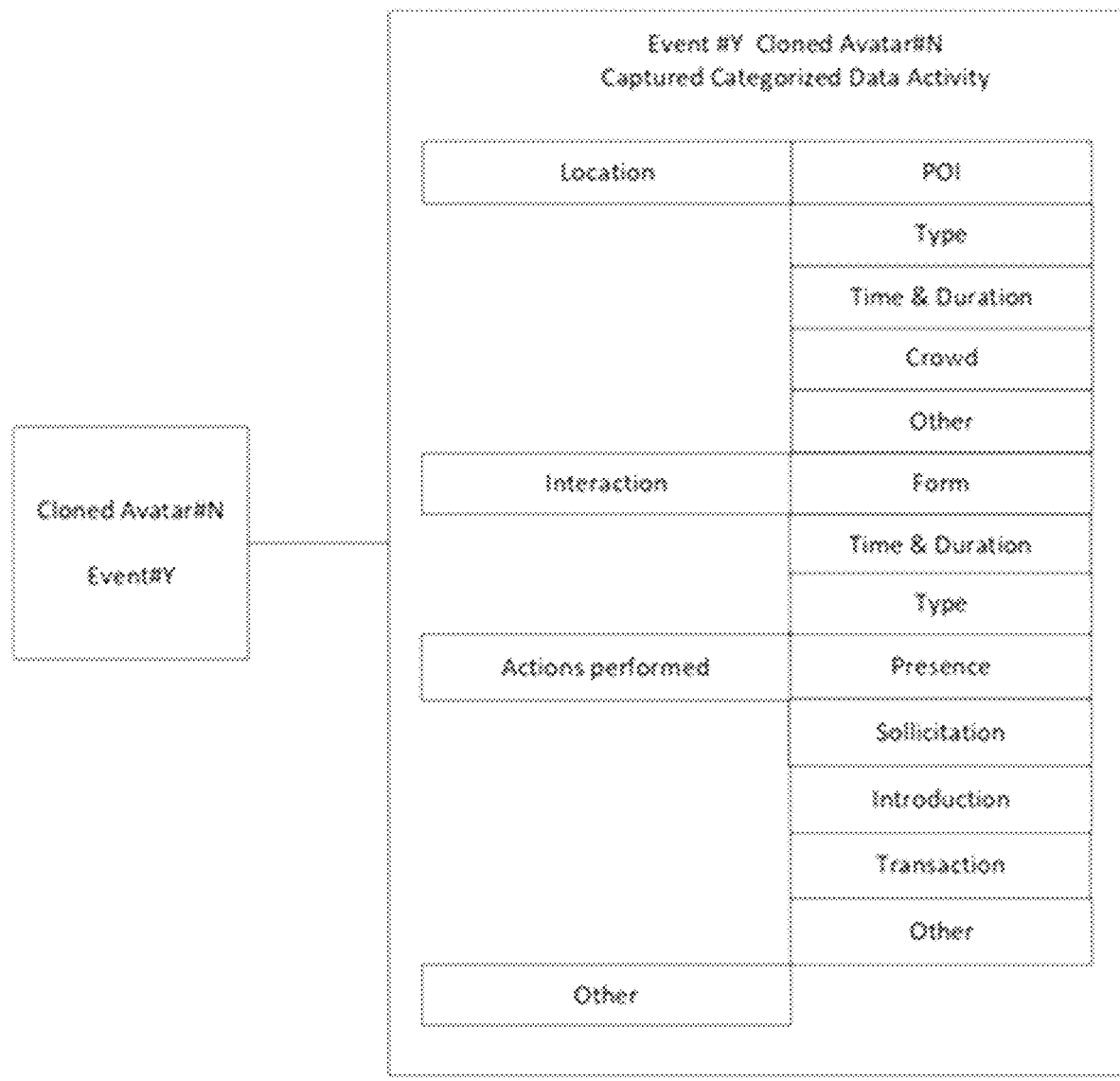
FIG. 10 is an example schematic diagram illustrating captured and categorized activities data, according to some embodiments.
Figure 11:
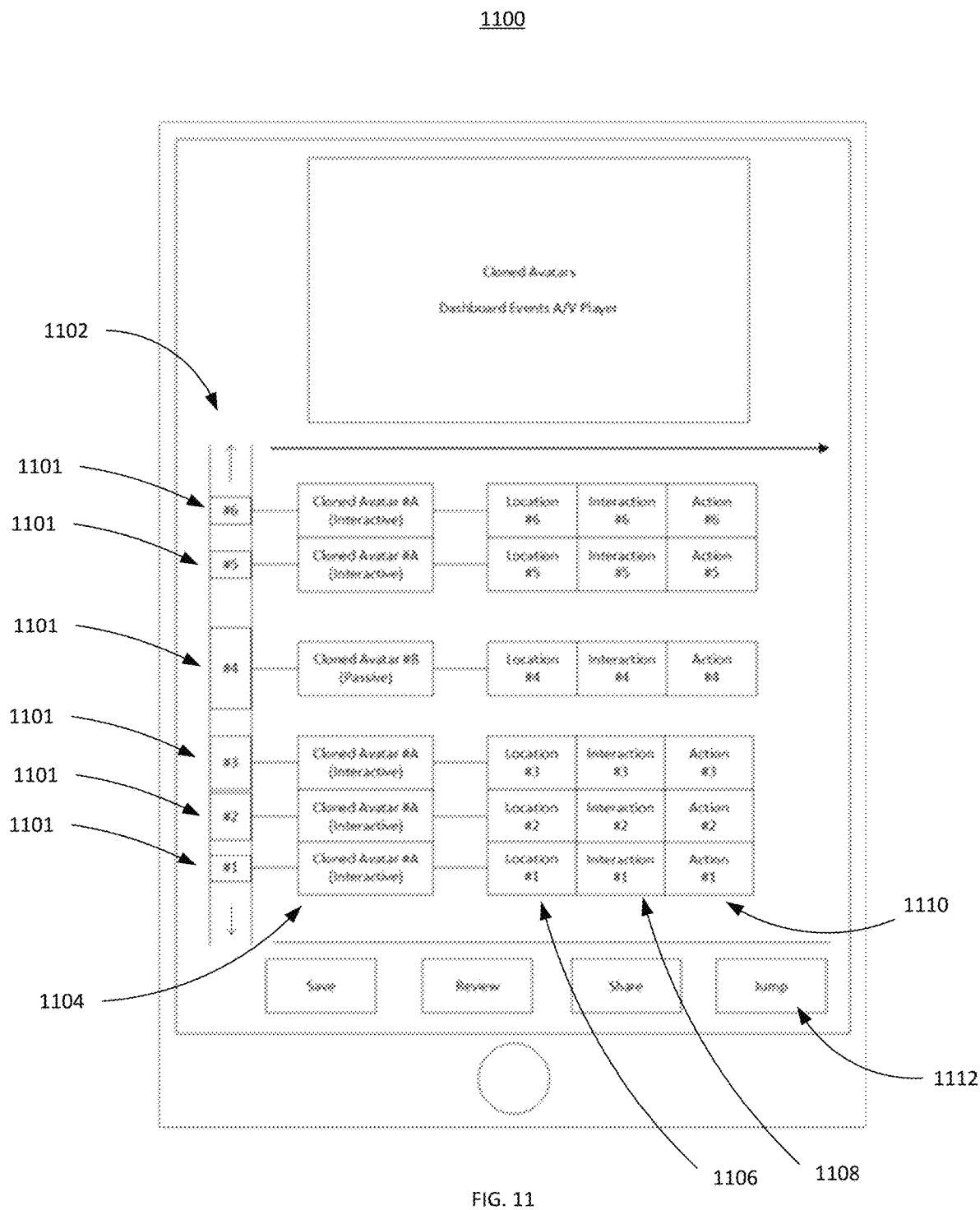
FIG. 11 is an example schematic diagram illustrating a reporting dashboard, according to some embodiments.

FIG. 10 is a schematic illustration of a captured activities diagram 1000, according to an embodiment. As shown in FIG. 10, captured activity data (e.g., captured using any of the systems and/or methods described herein) from a single event associated with a cloned avatar can be classified into various categories. The classified activity data associated with each event of a set of events can be aggregated to create a timeline of activities for each avatar. The timeline of activities for each avatar can be displayed in a reporting dashboard 1100, as shown in FIG. 11, for review and analysis.

The classification of captured activity data can be performed, for example, by a captured activities system (not shown) (also referred to as a "captured activities module," "captured activities systems" and a "captured activities system(s) module"). The captured activities system can be the same or similar in structure and/or function to any of the captured activities systems or system(s) modules described herein. For example, the captured activities system can be the same or similar in structure and/or function to the captured activities systems module 214 shown and described with respect to the server 200 in FIG. 2, the captured activities systems module 614 shown and described with respect to the system 600 in FIG. 6, the captured activities system 714 described above with respect to FIG. 7, the captured activities system 814 described above with respect to FIG. 8, and/or the captured activities system 914 described above with respect to FIG. 9.

The captured activities system can, for each event associated with a cloned avatar, classify activity data into one or more classes of a set of classes based on the relationship between the activity data and each class. The captured activities system can further classify the activity data into one or more subclasses of a set of subclasses associated with a class based on the relationship between the activity data and each subclass. In some implementations, during the classification process, the captured activities system can filter data to separate valuable activity data from data unintended for a specific categorization (e.g., data unnecessary for storage and/or primary review by a user) and can ignore, set aside, or discard unnecessary data. For example, if data does not include characteristics or content associated with any of a set of predefined classes or subclasses, the captured activities system can ignore the data, discard the data, or assign the data to an "other" class or subclass such that the data is still accessible by the user.

As shown in FIG. 10, for a cloned avatar, which can be one of a set of cloned avatars of a user, captured activity data associated with an event (e.g., for each event of a set of events) can be categorized (e.g., by a captured activities system) into one or more data classes or categories and logged (e.g., separately from log entries of remaining events of the set of events). For example, as shown in FIG. 10, activity data can be categorized into classes or categories including location-related activity data, interaction-related activity data, activity data related to actions performed, and/or other activity data. The location-related activity data can include location tracking-related activity data.

The activity data can be further categorized into subclasses or subcategories associated with a class or category (e.g., by the captured activities system). For example, the location-related activity data can include data and/or indicators associated with one or more points of interest (POI) within a metaverse environment. For example, the activity data can include data similar to or equivalent to "GPS" data or other point of interest-related data. The location-related activity data can include a location type, such as, for example, a university, retail shop, live concert, or museum. The location-related activity data can include a duration of time spent at a location (e.g., in minutes, hours, or days) and/or times associated with the avatars presence and/or activity at the location (e.g., arrival and/or departure time). The location-related activity data can include a distance traveled to get to the location, such as a metric that may be similar or equivalent to a number of steps taken to get to a location from a previous or reference location. The location-related activity data can include a duration of time over which the avatar traveled to get to the location (e.g., in minutes or hours) from a previous or reference location. The location-related activity data can include the number of avatars present at the location. The location-related activity data can include any other suitable location-related activity data. Thus, location-related activity data can be further classified into subclasses based on the particular type of information associated (e.g., POI, Type, Time and/or Duration, Crowd, Other), as shown for example in FIG. 10.

The interaction-related activity data can include data and/or indicators of a form of interaction between the cloned avatar and another avatar. For example, the form of interaction may be classified as gesture, audio, video, and/or audio/video. The interaction-related activity data can include data and/or indicators of a type of interaction between the cloned avatar and another avatar. For example, the type of interaction can be social, commercial, private, and/or public. The interaction-related activity data can include a time duration and/or a time (e.g., a start time and/or end time) of an interaction between the cloned avatar and another avatar. Additionally, the interaction-related activity data can optionally include data relating to the details of actions performed by the cloned avatar or the other avatar in the interaction (e.g., in addition to or as an alternative to including such detail with the activity data related to actions performed). Thus, interaction-related activity data can be further classified into subclasses based on the particular type of information associated (e.g., Form, Time and/or Duration, Type), as shown for example in FIG. 10.

The activity data related to actions performed can include, for example, data and/or indicators related to an avatar's presence action, solicitation action, introduction action, transaction action, and/or any other suitable data and/or indicators. The presence action data or indicator may indicate that the avatar was present at a particular location. For example, the indicator may indicate that the avatar included or wore a passive billboard at a particular location communicating a message. The solicitation action data or indicator can indicate that the avatar participated in the action of asking for or trying to obtain something from another avatar. The solicitation action data can include content detailing the solicitation and the outcome of the solicitation (e.g., a response from the other avatar) that is logged for review by the user. For example, the content can include a recording or speech-to-text conversion of the solicitation interaction. The introduction action data or indicator can indicate that the avatar responded to a request for a meeting from another avatar. The introduction action data can include content detailing the introduction and the outcome of the introduction that is logged for review by the user. For example, the content can include a recording or speech-to-text conversion of the introduction interaction. The transaction action data or indicator can include data or indicators associated with the avatar's placement and/or receipt of an order for one or more virtual digital goods or services. The transaction data can include and/or be based upon the content of a virtual digital wallet associated with the avatar, and may include, for example, an amount of one or more digital currencies, an amount of transferred digital currency, and/or an inventory of loaded digital goods. Thus, actions performed-related activity data can be further classified into subclasses based on the particular type of information associated (e.g., Presence, Solicitation, Introduction, Transaction, Other), as shown for example in FIG. 10.

As described with respect to other captured activities systems and system(s) modules herein, in addition to classifying activity data into classes and subclasses as described above, in some implementations, the captured activities system can also capture, receive, detect, identify, and/or correlate activity data associated with a cloned avatar. In some implementations, similarly as described above with respect to the captured activities systems module 214, the captured activity system can include features that are the same or similar to those of any of the audio/video capture systems modules and/or the AI navigation and control systems modules described herein. For example, in some implementations, the captured activities system can capture and/or analyze audio and/or video content to identify activity data associated with the cloned avatar (e.g., actions performed by, interactions of, and locations associated with the cloned avatar). In some implementations, the captured activities system can identify, analyze, and/or classify activity data based on data (e.g., audio and/or video content) collected by the captured activities system and/or data collected and/or previously analyzed by an audio/video capture systems module and/or an AI navigation and control systems module and provided to the captured activities system.

In some implementations, an AI navigation and control systems module, such as the module 916, can identify activity data associated with an event involving the cloned avatar (e.g., using one or more of the an audio/video (A/V) deconstruction module 916A, the object detection module 916B, the activity detection module 916C, the object identification module 916D, the activity identification module 916E, the object localization and prediction of movement module 916F, and/or the activity correlation module 916G) and provide the activity data to the captured activities system for classification. In some implementations, the activity data provided to the captured activities system can include data generated by a decision matrix module of an AI navigation and control system, such as the decision matrix module 916H.

In some implementations, during the classification process, the captured activities system can filter received, captured, detected, identified, and/or correlated data to separate valuable activity data from data unintended for a specific categorization (e.g., data unnecessary for storage and/or primary review by a user) and can ignore, set aside, or discard unnecessary data. For example, if data does not include characteristics or content associated with any of a set of predefined classes or subclasses, the captured activities system can determine that the data can be ignored, discarded, or categorized in a separate class or subclass (e.g., as an "other").

As described above, the captured activities system can aggregate classified activity data associated with a cloned avatar so that the activity of a cloned avatar associated with multiple events of the cloned avatar can be presented to a user for review in an organized manner (e.g., along a timeline). For example, in some implementations, the captured activities system can assign the activity data associated with a common event (e.g., based on a set of activity data occurring within a particular timeframe, being associated with a particular transaction, and/or occurring while a cloned avatar was continuously at a particular location) to that event, and can aggregate the classified data associated with multiple events for review (e.g., via an interactive display displaying, for example, the reporting dashboard shown in FIG. 11). In some implementations, rather than assigning the activity data associated with a common event to that event, the captured activities system can receive activity data and/or a source of activity data already associated with an event (e.g., from an audio/video capture systems module such as any described herein and/or from an AI navigation and control systems module such as any described herein).

As shown in FIG. 11 and referenced above, the captured activities associated with one or more avatars of a user of the one or more avatars can be presented to the user via a reporting dashboard 1100. In some implementations, the dashboard can be interactive. The dashboard can present (e.g., list) some or all of the past and present captured activities of each cloned avatar of the user/owner. In some implementations, a captured activities system, such as any described herein, can generate one or more instructions for a compute device to display the reporting dashboard and/or for a compute device to update the activity data presented on the reporting dashboard.

As shown in FIG. 11, for example, the dashboard 1100 can present the activities of interactive and/or passive cloned avatars of a user over time. The dashboard 1100 can be presented using a dashboard application. Activities associated with each cloned avatar can be aggregated and displayed as being associated with distinct events that contain all the captured data associated with that event, including video and/or audio of that event as captured by cloned avatar management systems, such as any of the cloned avatar management systems described herein. The logged events can be presented along a time axis 1102 and rendered for the user to observe live (e.g., in a live mode) or review in a delayed and/or recorded mode. For example, as shown in FIG. 11, the dashboard 1100 shows the logged events 1101 displayed along a vertical time axis 1102, with a cloned avatar identifier 1104, a location identifier 1106, an interaction identifier 1108, and an action identifier 1110 associated with (e.g., displayed horizontally relative to) each numbered event. In some implementations, a limited number of logged events can be actively displayed at a time (e.g., due to size of the dashboard 1100), so the logged events can move along the time axis 1102 as new events are logged, with new events causing older events to slide off-screen.

In the live mode, the dashboard 1100 can allow the user to "jump" into an on-going event to take control of an automated cloned avatar (e.g., via interaction with the dashboard 1100 such as by selecting the event and/or selecting the "Jump" button 1112 on the dashboard). For example, in some implementations, an avatar can be transitioned from a cloned avatar mode to a primary avatar mode automatically or under the control of the user, such as in a situation in which an event occurs involving the avatar in the cloned avatar mode and the cloned avatar is not able to respond (e.g., due to its pre-programmed limitations and/or situational environment). In some implementations, the user can switch from a mode in which the user is reviewing or observing the event or activities of the cloned avatar to a mode in which the cloned avatar becomes the primary avatar under real-time, active control by the user (e.g., via selecting the "Jump" button 1112).

In some implementations of any of the systems and/or methods described herein, a user may have one cloned avatar present and/or active in the metaverse while the user is inactive relative to the metaverse (e.g., not actively controlling an avatar in the metaverse in real-time). Since the metaverse can be an always-on environment with events happening at any and/or all hours of each day, it is not possible for a user of the metaverse to maintain an active presence via actively controlling an avatar in the metaverse at all times. In the mode of operation in which the user is inactive but the cloned avatar is present and/or active in the metaverse, the user may be logged into the metaverse or may have logged or signed out of the metaverse. In some implementations, when the user is inactive, the user's primary avatar is not active or present in the metaverse. In some implementations, when the user is inactive, the user's primary avatar can be present in the metaverse but not active (e.g., may not move or interact with the environment or other avatars due to the user not actively controlling the primary avatar). The user can enable a cloned avatar to be present and/or active in the metaverse by activating a cloned avatar management system, such as any of the cloned avatar management systems described herein, and/or by changing a status or other characteristics of the cloned avatar (e.g., via interacting with a dashboard and/or a cloned avatar management application 123) of the cloned avatar management system. The cloned avatar can then operate and be controlled in the metaverse by the cloned avatar management system based on the user's preferences (e.g., based on characteristics and/or rules selected by the user and/or determined by an AI navigation and control systems module as described with respect to other embodiments described herein). For example, the cloned avatar can operate in the metaverse according to a set of pre-defined rules, goals, and/or activities authorized by the user of the cloned avatar. In some implementations, the set of pre-defined activities can specify how the cloned avatar will represent the interest(s) of the user/owner in a "passive" mode and/or an "interactive" mode, as described in more detail with respect to other embodiments herein. As described above with respect to other embodiments, the cloned avatar management system can present information associated with the activities of the cloned avatar (e.g., in real time or at a later time) to the user via a display. For example, the cloned avatar management system can generate and display a dashboard, such as the dashboard 1100, on a display to the user to provide the user with a real-time and/or delayed time-based view of all activities encountered or performed by the cloned avatar within the metaverse. Thus, the user can maintain a presence in the metaverse through the cloned avatar without needing to actively participate, actively manage the cloned avatar, or actively engage any user inputs or controls, effectively enabling the user to have a continuous metaverse presence (e.g., 24 hours a day, seven days a week).

In some implementations of any of the systems and/or methods described herein, more than one cloned avatars of a user can be present and/or active in the metaverse while the user is inactive relative to the metaverse (e.g., while the user is not actively controlling an avatar in the metaverse in real-time). In some implementations, the multiple cloned avatars can operate simultaneously. In some implementations, the activities of each cloned avatar can be separately captured and/or each cloned avatar can be separately recorded by any of the audio/video capture systems modules and associated capture devices and/or captured activities systems modules and associated capture devices described herein. Furthermore, in some implementations, each cloned avatar can be individually controlled by a centralized AI navigation and control system module, such as any of the AI navigation and control system modules described herein. As described with respect to other embodiments herein, the activities encountered or performed by each of the cloned avatars can be displayed in real-time and/or delayed-time via a dashboard such as the dashboard 1100, for monitoring by the user. For example, the cloned avatar management system can generate and display a dashboard, such as the dashboard 1100, on a display to the user to provide the user with a real-time and/or delayed time-based view of all activities encountered or performed by each of the cloned avatar within the metaverse. Thus, while the user's primary avatar is inactive, the cloned avatar management systems can operate and control multiple cloned avatars.

In some implementations, a metaverse platform or other virtual environment may limit the number of avatars a user may be able to simultaneously own or use, or may limit the number of avatars a user may be able to own or use within a particular time period. In some implementations, any of the cloned avatar management systems described herein can concurrently operate and control cloned avatars associated with separate user accounts within the metaverse platform or other virtual environment, can aggregate data generated based on the cloned avatars associated with the separate user accounts, and can present the aggregated data in a single dashboard 1100. Thus, a single user can create multiple metaverse accounts and can configure each of them with at least one cloned avatar controllable using any of the cloned avatar management systems described herein. Accordingly, in some implementations, the cloned avatar management systems described herein can be used to control more avatars associated with a user in a metaverse platform or other virtual environment than a number of avatars that the metaverse platform or other virtual environment may allow a user to own or use relative to a single account associated with the metaverse platform or other virtual environment.

In some implementations of any of the systems and/or methods described herein, a user may have one or more cloned avatars present and/or active in the metaverse while the user is active in the metaverse (e.g., "online" and/or actively controlling a primary avatar in the metaverse in real-time in parallel to the presence or activity of one or more cloned avatars). For example, as described herein with respect to other implementations, a user can actively control a primary avatar in real-time in the metaverse while a cloned avatar management system, such as any of the cloned avatar management systems described herein, controls one or more cloned avatars in the metaverse. As described herein with respect to other implementations, the cloned avatar management system can generate a display (e.g., send instructions to a system or device including a display screen) to display information related to the activities of some or all of the one or more cloned avatars (e.g., information related to the activities of one or more cloned avatars that are not disposed or occurring within a threshold proximity to the primary avatar, such as a threshold proximity that defines a boundary of activities that the user can observe through actively controlling the primary avatar). For example, the cloned avatar management system can generate a dashboard, such as the dashboard 1100, displaying a real time view of the activities of some or all of the one or more cloned avatars. In some implementations, the display or dashboard generated by the cloned avatar management system can be interactive.

In some implementations, the user can transition between actively controlling a primary avatar to monitoring and/or actively controlling a cloned avatar. For example, in some implementations, the user can interact with the display (e.g., dashboard) generated by the cloned avatar management system to transition (e.g., jump or toggle back and forth) between controlling the primary avatar and reviewing and/or transitioning to actively control one of the cloned avatars. In response to the user's interaction with the display (e.g., selection of a button associated with transition such as a "jump" button), the cloned avatar management system can cause the cloned avatar to be actively controlled by one or more user inputs associated with the user (e.g., an input device such as a physical controller) rather than the cloned avatar being controlled by a control interface system of the cloned avatar management system emulating a user input. Such a transition allows the user to take control of a cloned avatar whenever needed or desired, effectively releasing control of the primary avatar back to the cloned avatar management system and causing the cloned avatar to become the primary avatar operated by the user. In some implementations, the cloned avatar management system can transition the former primary avatar to an inactive status after the transition of the cloned avatar to a status in which it is actively controlled by the user. In some implementations, the former primary avatar can continue operating within the metaverse as a cloned avatar under control of the cloned avatar management system. In some implementations, the cloned avatar management system can transition the former primary avatar from a primary avatar status to a status in which the former primary avatar becomes a cloned avatar directed and controlled by the cloned avatar management system (e.g., controlled according to rules, properties, and/or characteristics assigned by the user and/or the AI navigation and control systems module of the cloned avatar management system). In some implementations, the transition of an avatar from a primary avatar status to a cloned avatar status (no longer actively controlled in real-time by the user) may not be apparent to other avatars or entities in the metaverse due to the cloned avatar management system controlling the avatar such that the avatar continues operating and/or interacting within the metaverse (e.g., interacting similarly as the avatar was interacting when controlled in real-time by the user). In some implementations, the transition of an avatar from a primary avatar status to a cloned avatar status (no longer actively controlled in real-time by the user) may be apparent to other avatars or entities in the metaverse due to an indicator associated with the avatar and/or a behavior of the avatar changing (e.g., to indicate that the avatar is now operating as a clone and/or to indicate that the avatar is in a passive mode or an interactive mode).

In some implementations, a cloned avatar (e.g., a cloned avatar which was previously the primary avatar of the user) can be directed and/or controlled by the cloned avatar management system based on the location and/or activity of the primary avatar. For example, a cloned avatar may be instructed or controlled to follow a primary avatar as the primary avatar moves around the metaverse (e.g., at a particular distance, directly behind, and/or directly to the side of the primary avatar). As another example, a cloned avatar may be instructed or controlled to stay away from the primary avatar and/or from locations previously visited by the primary avatar (e.g., based on a particular distance from the primary avatar and/or based on a timeframe within which the primary avatar has visited a location). In some implementations, one or more cloned avatars can be directed toward "points of interest" flagged by the primary user based on the cloned avatars respective role(s) and capabilities. For example, a user can actively control a primary avatar to dispose an indicator (e.g., a flag) at a location, and the cloned avatar management system can control one or more cloned avatars to travel to and/or remain at a location associated with the indicator for a period of time (e.g., a period of time set by the user). For example, a passive cloned avatar can be instructed to remain at the corner of a busy intersection flagged by the primary user for the two hours following placement of a flag at the corner by the primary avatar. As another example, based on a primary avatar placing a flag in front of a particular event, an interactive cloned avatar can be instructed and/or controlled by the cloned avatar management system to stay at a location in front of the particular event and be available to interact with other avatars (e.g., to sell tickets, access to virtual goods, and/or access to virtual services to other avatars). Thus, cloned avatars can be leveraged to assist the user of a primary avatar in the metaverse virtual worlds.

In some implementations of any of the systems and/or methods described herein, one or more cloned avatars can be used for advertising content and/or services in the metaverse. The advertising content can include or be included on, for example, virtual clothing and/or virtual accessories of a cloned avatar. For example, the advertising content can include a logo, brand, and/or written and/or animated content displayed on an article of clothing worn by the cloned avatar, such as on a t-shirt or shoe(s), and/or displayed on a virtual accessory carried by the cloned avatar, such as a virtual sign (e.g., a "hello" sign) or a branded handbag product. A cloned avatar management system, such as any of the cloned avatar management systems described herein, can be used to control the presentation of the advertising content by the avatar (e.g., based on user input and via, for example, a cloned avatar roles and properties module and/or a cloned avatar modeling and personalization module of the cloned avatar management system). For example, using the cloned avatar management system, a user can instruct a cloned avatar (e.g., in a passive mode or an interactive mode) to go to and/or remain at a virtual location (e.g., a virtual busy street intersection) holding and/or wearing advertising content to try to attract the attention of passing-by avatars. The cloned avatar management system can then control the cloned avatar to execute such instructions. Furthermore, similar to a person in the real world, using the cloned avatar management system, the user can optionally instruct the cloned avatar to use physical movement in the metaverse to attract the attention of passing-by avatars, such as jumping, dancing or moving along the streets. The cloned avatar management system can then control the cloned avatar to execute such physical movements. In some implementations, to identify the number of avatars that are likely to have seen the advertised content of a passive or interactive cloned avatar, the cloned avatar management system can generate a display (e.g., using a dashboard, such as the dashboard 1100) of the number of avatars that come within a threshold proximity of the cloned avatar. In some implementations, the cloned avatar can be in an interactive mode and, under control of the cloned avatar management system, the cloned avatar can reply to direct queries from passing-by curious avatars, similar to a clickthrough model of advertising. In some implementations, the cloned avatar management system can track the number of queries received, the content of the queries, and from which avatar the queries were received and display such information (e.g., using a dashboard, such as the dashboard 1100) such that the user (i.e., owner of the cloned avatar) can follow up with the owner of the interested or requesting avatar(s) with which the cloned avatar interacted.

In some implementations, the systems described herein (e.g., including any of the cloned avatar management systems described herein) can be used to match avatars in the metaverse according to what one or more users of the metaverse may be seeking and/or offering. For example, in some implementations, a cloned avatar management system, which can be the same or similar in structure and/or function to any of the cloned avatars systems described herein, can identify a seeker avatar and a provider avatar from one or more sets of avatars based on characteristics associated with the seeker avatar and/or the provider avatar. For example, the seeker avatar can be identified based on whether the seeker avatar is seeking or is open to what is being offered by the provider avatar, and/or vice versa. In some implementations, the seeker avatar and/or the provider avatar can be identified based on whether one or both avatars have a score (e.g., a matching score) above a threshold score or ranked above a threshold ranking of other avatars or combinations of avatars. In some embodiments, the cloned avatar management system can determine and/or assign the scores and/or rankings to one or more avatars of one or more sets of avatars prior to determining whether an avatar from the one or more sets of avatars has a sufficiently high score or ranking to be matched as a seeker or provider avatar. The scores and/or rankings can be based, at least in part, for example, on how many of a number of factors the potential seeker and the potential provider have in common (or on a weighted score based on the factors in common). The factors can include, for example, availability of a resource, proximity of an avatar, cost and/or characteristics associated with a user as described below. In some implementations, the respective locations of the seeker avatar and the provider avatar can be determined by the cloned avatar management system (e.g., after the cloned avatar management system identifies the seeker avatar and/or the provider avatar). The cloned avatar management system can then direct (e.g., share target location and/or control movement of) the seeker avatar to a virtual location of the provider avatar (e.g., using a GPS-like navigation system) or vice versa.

In some implementations, a user can use any of the cloned avatar management systems described herein to identify and find the virtual location of another avatar having characteristics (e.g., skill sets, traits, needs, resources, interests, and/or proximity to the user or a desired target location) desired by the user (e.g., so that the user can meet and interact with the user/owner of the other avatar via the avatars). For example, a first user can use the cloned avatar management system to identify and find the virtual location of an avatar of second user having knowledge valuable to the first user that is within a particular proximity to the first user's avatar in the metaverse (e.g., a sufficiently small proximity such that the other avatar is accessible by the user within a reasonable amount of time and with a reasonable amount of effort). The cloned avatar management system can account for factors such as the characteristics of the seeking avatar and/or the provider avatar, the distance between pairs of avatars, travel time between pairs of avatars, availability (e.g., schedule-based availability) of the seeking avatar and/or the provider avatar, etc. to determine a potential match desired by the user. As an example, the cloned avatar management system, in response to a request from a user for a teacher, for assistance in improving a skill of the user, or for an answer to a question, can identify and find the virtual location of an avatar of a teacher (e.g., a subject matter expert, for example, in mathematics) to help the user learn a new skill or find the answer to a question (e.g., in preparation for an exam of the user).

In some implementations, an AI navigation and control system module, such as any of the AI navigation and control system modules described herein, can be used to determine the locations of the avatars considered in an avatar matching analysis, including the identified seeker avatar and provider avatar. In some implementations, the AI navigation and control system module can automatically drive (e.g., control movement of) the seeker avatar toward the provider avatar and/or the provider avatar toward the seeker avatar. In some implementations, the AI navigation and control system module can determine the locations of the seeker avatar and the provider avatar and, in conjunction with a control interface systems module such as any of the control interface systems modules described herein, can drive the seeker avatar toward the provider avatar (and/or vice versa) in the absence of integration with the metaverse platform due to the control interface systems module being able to emulate user control inputs to control the avatar(s). In some implementations, rather than identifying an avatar match for the user's avatar, the cloned avatar management system (e.g., the AI navigation and control systems module) can identify virtual points of interest, encounters, and/or services available in the metaverse that are responsive to the needs or goals identified by the user (via interaction between the user and the cloned avatar management system). In some implementations, the cloned avatar management system (e.g., the AI navigation and control systems module) can identify a path to be taken by an avatar (e.g., the seeker avatar and/or the provider avatar) within the metaverse that is based on virtual points of interest, encounters, and/or services available that meet the needs and/or interests of the avatar. The seeker avatar and/or the provider avatar can each be a primary avatar and/or a cloned avatar during any or all of the process steps described.

In some implementations, the systems described herein (e.g., including any of the cloned avatars systems described herein) can be used to facilitate interactions between opportunity seekers (e.g., employment seekers) and opportunity providers (e.g., employers) and/or intermediaries (e.g., recruiters). In some implementations, a user who is seeking a job (also referred to herein as a job seeker) can use a cloned avatar as a job seeker cloned avatar to represent the interests and profile of the job seeker in the metaverse. The profile of the job seeker can include, for example, the job seeker's characteristics and qualifications. Under the control of the cloned avatar management system, the job seeker cloned avatar can actively seek employment opportunities (e.g., listed jobs) in the metaverse at all hours of the day and all days of the week. In some implementations, under the control of the cloned avatar management system, the job seeker cloned avatar can share a resume, skillset, and/or the background of the job seeker. Under the control of the cloned avatar management system, the job seeker cloned avatar can share the employment-related information of the job seeker in a more personalized, targeted, efficient, and automated manner than if the job seeker merely submitted resumes to jobs posted on various publicly-available job opportunity databases and lists.

Alternatively or additionally, a recruiter can use one or more cloned avatars to interact with interested job seeker cloned avatars. For example, the recruiter can own a dedicated cloned avatar for each employment position or type available. Using the cloned avatar management system, the cloned avatar(s) of the recruiter can be configured to provide and/or explain the requirements and skillset associated with the available employment position to any avatar (e.g., a cloned avatar or a primary avatar) who expresses interest or requests such information. Thus, in some implementations, a recruiting service company can provide a set of recruiting immersive services, at scale, to job seekers and recruiters in the metaverse by using cloned avatars pre-programmed with requisite education and job listing requirements.

In some implementations, the cloned avatar management system (e.g., a recruiting services module and/or an AI navigation and control systems module) can be configured (e.g., using a matching algorithm) to determine a match score between characteristics of a job seeker (e.g., based on a job seeker profile and/or resume) and requirements associated with an employment opportunity. For example, the system can deconstruct a resume and a job listing and extract relevant information from each, determine a match score between the resume and the job listing, and communicate a response to a job seeker cloned avatar based on the match score (e.g., via a recruiting cloned avatar owned by a recruiter). For example, if the match score is above a threshold score and/or particular requirements of an open employment position are met by a job seeker's characteristics, the job seeker can be advanced or given the option to advance in the recruitment process (e.g., by the cloned avatar management system). Furthermore, the recruiting cloned avatar can communicate to the job seeker cloned avatar that the job seeker is being advanced in the recruitment process and can include reasons therefore. If the match score is below a threshold score and/or a requirement of the job opportunity is not met by the job seeker's characteristics, the recruiting cloned avatar can communicate that the job seeker is being rejected and can include reasons therefore. In some implementations, if a job seeker is determined to be a match (e.g., have a match score above a threshold) with an open employment position, the job seeker can be advanced to a subsequent portion of the recruitment process automatically.

In some implementations, if a job seeker is rejected, the recruiting cloned avatar, under control of the cloned avatar management system, can provide explanations and/or suggested courses of action to the job seeker avatar. In some implementations, the recruiting cloned avatar can recommend and/or offer upskilling services that may be related to the characteristics and/or requirements that the job seeker lacked relative to the requirements of the open employment opportunity. Thus, unlike in typical job applications processes in the physical or real world, the systems and methods described herein can provide feedback regarding a job seeker's interest and/or application relative to an open employment position, including explanations for decisions and suggestions for future improvement. In some implementations, for example, a job seeker cloned avatar that is interested in a job but lacks the skills needed to apply or be selected, or is in need of a skills refresher session, can be redirected to a virtual location within the metaverse (e.g., an "UpSkilling Booth Center" such as a metaverse university or learning center) that provides on-demand upskilling and/or skill refresh services. In some implementations, the job seeker cloned avatar can be directed by the cloned avatar management system toward the closest location that has available services to meet the job seeker's skill improvement needs. In some implementations, the skills training can be delivered automatically (e.g., through scripts-based Q&A sessions) or through interaction with a primary avatar of a knowledgeable subject matter expert. In some implementations, the job seeker cloned avatar can be replaced by the primary avatar of the job seeker or can be transitioned to become the primary avatar of the job seeker upon arriving at the location intended for a training session and/or upon a match being established and/or a meeting occurring between the job seeker cloned avatar and the primary avatar of the subject matter expert. The job seeker can be notified (e.g., through a dashboard displayed by the cloned avatar management system) of the upcoming or pending training session or interaction session with the primary avatar of the subject matter expert such that the job seeker can opt into the session.

In some implementations, a user's cloned avatar, under the control of the cloned avatar management system, can order physical goods within the metaverse for delivery to the user's physical location. For example, a user of a primary avatar may be busy and unable to leave an on-going virtual activity (e.g., a virtual work meeting). The user can instruct a cloned avatar owned by the user to travel to a virtual retail location (e.g., a virtual restaurant or coffee shop), place an order for a physical good (e.g., a cup of coffee or a burger and fries), and pay for the order using a virtual wallet associated with the cloned avatar. The physical good can then be delivered to the physical location of the user of the cloned avatar in the real world.

In some implementations, a user (e.g., an individual user or a business) can deploy one or more cloned avatars in the metaverse to monitor one or more properties, other avatars, and/or events in the metaverse under the control of a cloned avatar management system, such as any of the cloned avatar management systems described herein. In some implementations, the one or more cloned avatars can function as or similarly to security guards, police officers, and/or members of a neighborhood watch organization. In some implementations, streaming data captured from the viewpoint of a cloned avatar (e.g., using a captured activities systems module or an audio/video capture systems module of the cloned avatar management system) can be used to provide a perspective of an incident happening in proximity to the cloned avatar. In some implementations, streaming data can be captured from the viewpoint of multiple cloned avatars and used to provide alternate perspectives of incidents happening in proximity to the cloned avatars. In some implementations, the collected streaming data can be provided to an interested party to be considered in addition to any other data captured related to a virtual business, virtual private home, or other location of interest. Thus, in some implementations, a business in the metaverse can provide virtual security monitoring for other metaverse businesses or consumers (e.g., to complement or substitute for any security monitoring measures deployed by a metaverse platform operator) using cloned avatars owned by the business or owned by users associated with the business.

In some implementations, the cloned avatar(s) of a user can be configured by the cloned avatar management system (e.g., based on input provided by the user) based on the security, privacy, and/or monitoring needs of the user. For example, the cloned avatar(s) can be passive (e.g., able to observe activity but without any power to interact or stop an activity from occurring) or interactive (e.g., able to observe and interact with other avatars when an incident is detected, such as to provide feedback to avatars suspected of bad behavior). Additionally, the cloned avatar(s) can be configured to remain in a fixed virtual location or to move relative to a fixed virtual location (e.g., within a particular perimeter or area).

In some implementations, cloned avatars, under the control of a cloned avatar management system such as any of the cloned avatar management systems described herein, can function as tourist guides for other avatars in the metaverse. For example, the metaverse can include virtualized versions of real-world cities, including, for example, historical buildings, parks, universities, and/or museums duplicated from the real world in the virtual world. Additionally, newly-designed metaverse cities can also include landmarks and points of interest that may interest tourists. A cloned avatar can be configured and/or controlled by the cloned avatar management system to automatically travel from location to location based on a generic or personalized tourist program. The cloned avatar can deliver explanations along the tourist route (e.g., associated with various points of interest) to primary avatars of other users participating in the tourist service led by the cloned avatar. Thus, in some implementations, a metaverse business can provide a set of tourism-related services to future users of the metaverse using cloned avatars pre-programmed with the requisite tourism knowledge or using cloned avatars controlled by the cloned avatar management system to deliver the requisite tourism knowledge.

In some implementations, cloned avatars can be used to onboard new members of an organization, such as new students to a virtual university or new employees to a virtual business. For example, using the cloned avatar management system, cloned avatars can be pre-programmed with the requisite onboarding knowledge to enable a metaverse university or corporation to provide a set of admission and/or human resources-related services to future students and employees. Thus, rather than a prospective student needing to visit a physical campus before admission to a university, which is costly and time-consuming, a university (e.g., a real-world university having a virtual-world equivalent) can execute a similar onboarding experience using cloned avatars. Furthermore, the onboarding experience in the virtual university can be provided free of bias, human resources, scheduling conflicts, and other physical constraints while allowing for scalability, the delivery of detailed information, and personalized services. The cloned avatars can be configured and/or controlled by the cloned avatar management system to provide campus tours and/or answer questions regarding the university and student experience. As another example, a business having a virtual-world equivalent can conduct onboarding of new or prospective employees using cloned avatars (e.g., cloned avatars specialized in human resources pre-programmed activities) under the control of the cloned avatar management system.

In some implementations, a secondary avatar that may or may not be a clone of the primary avatar can be associated with the primary avatar and/or other avatars or objects by the coned avatar management system based on a set of rules selected by the user (i.e., owner) of the primary avatar. In some implementations, the inclusion of a secondary avatar functioning as a companion can provide a more life-like user experience for the user controlling the primary avatar. Since the user can only control the primary avatar at any given time, the systems and methods described herein can manage the rendering, movement, and actions of the secondary avatar. For example, the user can select a secondary avatar to be present in the metaverse alongside the primary avatar as a companion. The secondary avatar can be, for example, a pet. The secondary avatar can be driven by the cloned avatar management system based on a set of rules set by the user (i.e., its owner) such as "follow the primary avatar/me" or "don't follow the cats." The secondary avatar can be rendered in two dimensions or three dimensions like any cloned avatar.

As used herein, the singular forms "a," "an" and "the" include plural referents unless the context clearly dictates otherwise. Thus, for example, the term "an educational content file" is intended to mean a single educational content file or multiple educational content files with similar functionalities. For another example, the term "an ordered playlist" is intended to mean a single ordered playlist or multiple ordered playlists.

While various embodiments have been described and illustrated herein, one will readily envision a variety of other means and/or structures for performing the function and/or obtaining the results and/or one or more of the advantages described herein, and each of such variations and/or modifications is deemed to be within the scope of the embodiments described herein. More generally, one will readily appreciate that all parameters, dimensions, materials, and configurations described herein are meant to be examples and that the actual parameters, dimensions, materials, and/or configurations will depend upon the specific application or applications for which the teachings is/are used. One will recognize, or be able to ascertain using no more than routine experimentation, many equivalents to the specific embodiments described herein. It is, therefore, to be understood that the foregoing embodiments are presented by way of example only and that, within the scope of the disclosure, including the appended claims and equivalents thereto, disclosed embodiments may be practiced otherwise than as specifically described and claimed. Embodiments of the present disclosure are directed to each individual feature, system, tool, element, component, and/or method described herein. In addition, any combination of two or more such features, systems, articles, elements, components, and/or methods, if such features, systems, articles, elements, components, and/or methods are not mutually inconsistent, is included within the scope of the present disclosure.

The above-described embodiments can be implemented in any of numerous ways. For example, embodiments may be implemented using hardware, software or a combination thereof. When implemented in software, the software code can be stored (e.g., on non-transitory memory) and executed on any suitable processor or collection of processors, whether provided in a single computer or distributed among multiple computers.

Further, it should be appreciated that a compute device including a computer can be embodied in any of a number of forms, such as a rack-mounted computer, a desktop computer, a laptop computer, netbook computer, or a tablet computer. Additionally, a computer can be embedded in a device not generally regarded as a computer but with suitable processing capabilities, including a smart phone, smart device, or any other suitable portable or fixed electronic device.

Also, a computer can have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer can receive input information through speech recognition or in other audible format.

Such computers can be interconnected by one or more networks in any suitable form, including a local area network or a wide area network, such as an enterprise network, and intelligent network (IN) or the Internet. Such networks can be based on any suitable technology and can operate according to any suitable protocol and can include wireless networks, wired networks or fiber optic networks.

The various methods or processes outlined herein can be coded as software that is executable on one or more processors that employ any one of a variety of operating systems or platforms. Additionally, such software can be written using any of a number of suitable programming languages and/or programming or scripting tools, and also can be compiled as executable machine language code or intermediate code that is executed on a framework or virtual machine.

In this respect, various disclosed concepts can be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but can be distributed in a modular fashion amongst a number of different computers or processors to implement various aspects of the disclosure.

Computer-executable instructions can be in many forms, such as program modules, executed by one or more computers or other devices. Generally, program modules include routines, programs, objects, components, data structures, etc. that perform particular tasks or implement particular abstract data types. Typically the functionality of the program modules can be combined or distributed as desired in various embodiments.

Also, various concepts can be embodied as one or more methods, of which an example has been provided. The acts performed as part of the method may be ordered in any suitable way. Accordingly, embodiments can be constructed in which acts are performed in an order different than illustrated, which can include performing some acts simultaneously, even though shown as sequential acts in illustrative embodiments. All publications, patent applications, patents, and other references mentioned herein are incorporated by reference in their entirety.

The invention claimed is:

1. A method, comprising:
   receiving, at a processor, data associated with a surrounding of a first online avatar of a user in a virtual reality application;
   detecting, at the processor based on the data and using a first machine learning model, a plurality of objects in the surrounding;
   determining, at the processor and based on object types of the plurality of objects, a plurality of characteristics of each object from the plurality of objects;
   predicting, at the processor, at least one movement parameter of each object, based on the data and the plurality of characteristics of that object;
   determining, at the processor and using a second machine learning model, an action from a plurality of actions to be executed by the first online avatar within the virtual reality application, based on the at least one movement parameter of the object from the plurality of objects;
   converting the action to a user command based on a controller type of a controller that the user uses to control a second online avatar of the user in the virtual reality application; and
   sending an instruction to effectuate, in the virtual reality application and based on the user command, the action to the first online avatar of the user without an input from the user.

2. The method of claim 1, further comprising:
   providing a selection to the user to switch between the first online avatar and the second online avatar.

3. The method of claim 1, wherein:
   the first online avatar is an alternative online avatar configured to perform the action without the input from the user; and
   the second online avatar is a primary online avatar controlled by the user via a plurality of inputs from the user.

4. The method of claim 3, wherein:
   the first online avatar and the second online avatar are active simultaneously in the virtual reality application.

5. The method of claim 1, wherein:
   the determining the action is based on a plurality of rules that specifies a set of actions from the plurality of actions allowed for the first online avatar to perform.

6. The method of claim 1, wherein:
   the processor is a first processor;
   the virtual reality application is executed by a second processor that is configured to be in communication with the first processor via a network.

7. The method of claim 1, wherein:
   the data associated with the surrounding of the first online avatar include at least one of video data and audio data.

8. The method of claim 1, wherein the plurality of characteristics of the object includes at least one of a identifier, a function, whether it stays in one location or moves, a size, a color, a current movement status, an estimated speed, and a location.

9. The method of claim 1, wherein the at least one movement parameter of the object includes at least one of a moving direction, a speed, and a likelihood of movement in a pre-determine time period.

10. The method of claim 1, wherein the controller type includes at least one of a keyboard, mouse, joystick, motion controller, or virtual controller.

11. The method of claim 1, wherein the user is offline while the processor determines the action and sends the instruction to effectuate the action.

12. A non-transitory processor-readable medium storing code representing instructions to be executed by a processor, the code comprising code to cause the processor to:
   receive data associated with a surrounding of an alternative online avatar of a user a virtual reality application, the alternative online avatar configured to perform a first plurality of actions based on a plurality of pre-determined rules, the alternative online avatar differing from a primary online avatar of the user configured to perform a second plurality of actions in the virtual reality application based on input of the user;
   detect, based on the data, at least one object in the surrounding;
   determine, based on the data, a plurality of characteristics of the at least one object, the plurality of characteristics including at least one movement parameter of the at least one object;
   determine, using a machine learning model, an action from the first plurality of actions to be executed by the alternative online avatar within the virtual reality application, based on the at least one movement parameter of an object from the plurality of objects; and send an instruction to effectuate, in the virtual reality application, the action to the alternative online avatar of the user.

13. The non-transitory processor-readable medium of claim 12, wherein the code further comprises code to cause the processor to:
   convert the action to a user command based on a controller type of a controller that the user uses to control the primary online avatar of the user in the virtual reality application.

14. The non-transitory processor-readable medium of claim 12, wherein:
   the primary online avatar and the alternative online avatar are active simultaneously in the virtual reality application.

15. The non-transitory processor-readable medium of claim 12, wherein:
   the processor is a first processor;
   the virtual reality application is executed by a second processor that is configured to be in communication with the first processor via a network.

16. The non-transitory processor-readable medium of claim 15, wherein:
   the second processor is configured to provide a selection to the user to switch between the primary online avatar and the alternative online avatar.

17. The non-transitory processor-readable medium of claim 12, wherein:
   the data include at least one of video data or audio data.

18. The non-transitory processor-readable medium of claim 12, wherein the plurality of characteristics of the object includes at least one of a name, a size, a color, a moving status, an estimated speed, or a location.

19. The non-transitory processor-readable medium of claim 12, wherein the at least one movement parameter of the object includes at least one of a moving direction, a speed, or a likelihood of movement in a pre-determine time period.

20. A method, comprising:
   receiving data associated with a surrounding of a first online avatar of a user in a virtual reality application, the first online avatar of the user being an alternative online avatar configured to perform a first plurality of actions based on a plurality of pre-determined rules, the alternative online avatar being different from a primary online avatar of the user configured to perform a second plurality of actions in the virtual reality application based on user's input;

detecting, based on the data, an activity associated with a virtual person or a virtual place in the surrounding;

determining, using a machine learning model, an action from the first plurality of actions based on the plurality of pre-determined rules to be applied to the first online avatar of the user to respond to the activity; and sending an instruction to effectuate, in the virtual reality application, the action to the first online avatar of the user without an input from the user.

21. The method of claim 20, further comprising:

converting the action to a user command based on a controller type of a controller that the user uses to control the primary online avatar of the user in the virtual reality application.

\* \* \* \* \*